(12) United States Patent
Weiberle et al.

(10) Patent No.: US 7,669,079 B2
(45) Date of Patent: Feb. 23, 2010

(54) METHOD AND DEVICE FOR SWITCHING OVER IN A COMPUTER SYSTEM HAVING AT LEAST TWO EXECUTION UNITS

(75) Inventors: Reinhard Weiberle, Vaihingen/Enz (DE); Bernd Mueller, Gerlingen (DE); Yorck von Collani, Beilstein (DE); Rainer Gmehlich, Ditzingen (DE); Eberhard Boehl, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 11/666,183

(22) PCT Filed: Oct. 25, 2005

(86) PCT No.: PCT/EP2005/055503

§ 371 (c)(1),
(2), (4) Date: Feb. 27, 2008

(87) PCT Pub. No.: WO2006/045777

PCT Pub. Date: May 4, 2006

(65) Prior Publication Data

US 2008/0270660 A1 Oct. 30, 2008

(30) Foreign Application Priority Data

| Oct. 25, 2004 | (DE) | ................ 10 2004 051 937 |
| Oct. 25, 2004 | (DE) | ................ 10 2004 051 950 |
| Oct. 25, 2004 | (DE) | ................ 10 2004 051 952 |
| Oct. 25, 2004 | (DE) | ................ 10 2004 051 964 |
| Oct. 25, 2004 | (DE) | ................ 10 2004 051 992 |
| Aug. 8, 2005 | (DE) | ................ 10 2005 037 237 |

(51) Int. Cl.
*G06F 11/00* (2006.01)

(52) U.S. Cl. ................ 714/10; 714/11; 714/12

(58) Field of Classification Search ................ None
See application file for complete search history.

(56) References Cited

U.S. PATENT DOCUMENTS

| 6,615,366 | B1 | 9/2003 | Grochowski et al. |
| 6,640,313 | B1 * | 10/2003 | Quach ................ 714/10 |
| 7,055,060 | B2 * | 5/2006 | Nguyen et al. ................ 714/11 |
| 7,287,185 | B2 * | 10/2007 | Safford et al. ................ 714/11 |
| 7,308,566 | B2 * | 12/2007 | Michaelis et al. ................ 713/1 |

(Continued)

FOREIGN PATENT DOCUMENTS

CN  1477529  2/2004

OTHER PUBLICATIONS

Microsoft Computer Dictionary, 4th Ed. Microsoft Press, 1999, p. 282.*

*Primary Examiner*—Christopher S McCarthy
(74) *Attorney, Agent, or Firm*—Kenyon & Kenyon LLP

(57) ABSTRACT

A device and method for switching over in a computer system having at least two execution units are provided, in which switchover units are included which are designed in such a way that they switch between at least two operating modes, a first operating mode corresponding to a comparison mode and a second operating mode corresponding to a performance mode. A programmable interrupt controller is assigned to each execution unit, and a storage element is included, in which information is stored that describes at least parts of a configuration of at least one of these interrupt controllers.

19 Claims, 23 Drawing Sheets

U.S. PATENT DOCUMENTS

2002/0073357 A1  6/2002  Dhong et al.
2004/0019771 A1* 1/2004  Quach ........................ 712/229
2004/0123201 A1  6/2004  Nguyen et al.

* cited by examiner

METHOD AND DEVICE FOR SWITCHING OVER IN A COMPUTER SYSTEM HAVING AT LEAST TWO EXECUTION UNITS

BACKGROUND OF THE INVENTION

1. Field of the Invention

The present invention relates to a method and a device for switching over in a computer system having at least two execution units.

2. Description of Related Art

Transient errors, triggered by alpha particles or cosmic radiation, are an increasing problem for integrated semiconductor circuits. Due to declining structure widths, decreasing voltages and higher clock frequencies, there is an increasing probability that a voltage spike, caused by an alpha particle or cosmic radiation, will falsify a logic value in an integrated circuit. The effect can be a false calculation result. Therefore, in safety-related systems, especially in the motor vehicle, such errors must be reliably detected.

In safety-related systems such as an ABS control system in a motor vehicle in which malfunctions of the electronic equipment must be detected with certainty, usually redundancies for error detection are used in the corresponding control devices of such systems. So, for instance, in known ABS systems, in each case the complete microcontroller is duplicated, the total ABS functions being calculated redundantly and checked for agreement. If a discrepancy appears in the results, the ABS system is switched off.

Essential components of a microcontroller are, on one hand, storage modules (e.g., RAM, ROM, cache), the core and the input/output interfaces, the so-called peripherals (e.g., analog-digital converter, CAN interface). Since storage elements can be effectively monitored using test codes (parity or ECC), and peripherals are often monitored specific to the application as part of a sensor signal path or actuator signal path, a further redundancy approach lies in solely doubling the core of a microcontroller.

Such microcontrollers having two integrated cores are also known as dual-core architectures. Both cores execute the same program segment redundantly and in clock-controlled synchronism (lockstep mode), the results of the two cores are compared and an error will then be detected in the comparison for agreement. This configuration of a dual-core system may be denoted as a comparison mode.

Dual-core architectures are also used in other applications to increase output, thus for performance enhancement. Both cores execute different programs, program segments and commands, whereby an increase of output can be attained, which is why this configuration of a dual-core system may be denoted as a performance mode. This system is also called a symmetrical multiprocessor system (SMP).

An expansion of these systems involves a switchover by software between these two modes by way of an access to a special address and specialized hardware devices. In comparison mode, the output signals of the cores are compared to each other. In performance mode, the two cores operate as a symmetrical multiprocessor system (SMP) and execute different programs, program segments or commands.

When using such systems, the problem occurs that in the switchover, it is also necessary to switch interrupt sources. Therefore, the object of the present invention is to provide methods and means which permit an optimal switchover of the interrupt sources.

BRIEF SUMMARY OF THE INVENTION

A device is provided for switching over in a computer system having at least two execution units, switchover means being included that are designed in such a way that they switch between at least two operating modes, a first operating mode corresponding to a comparison mode and a second operating mode corresponding to a performance mode, characterized in that a programmable interrupt controller is assigned to each execution unit, and a storage element is included in which information is stored that describes at least parts of a configuration of at least one of these interrupt controllers.

Advantageously, a device is provided in which means are provided that permit a transfer of information from the storage element to at least one of the interrupt controllers.

A device is expediently provided in which the means are implemented in hardware.

A device is advantageously provided which is implemented in such a way that in the switchover between a performance mode and a comparison mode, a new configuration of at least one interrupt controller is realized by transferring information from the storage element to at least one interrupt controller.

Expediently, a device is provided in which the entire configuration information of at least one interrupt controller is contained in the storage element.

Advantageously, a device is provided in which the information is utilized for configuring at least one interrupt controller.

Advantageously, a device is provided in which the storage element is in the form of a register record.

A device is expediently provided in which the storage element is in the form of an interrupt masking register.

Advantageously, a device is provided in which interrupts are triggered simultaneously in a comparison mode.

A device is advantageously provided which is configured in such a way that, in the switchover from a performance mode to a comparison mode, the same information is transferred from the storage element to at least two interrupt controllers.

Advantageously, a method is provided for switching over in a computer system having at least two execution units, switchover means being included that are designed in such a way that they switch between at least two operating modes, a first operating mode corresponding to a comparison mode and a second operating mode corresponding to a performance mode, characterized in that a programmable interrupt controller is assigned to each execution unit, and a storage element is included in which information is stored that describes at least parts of a configuration of at least one of these interrupt controllers.

A method is expediently provided in which information is transferred from the storage element to at least one of the interrupt controllers.

A method is advantageously provided in which information is transferred via a hardware medium from the storage element to at least one of the interrupt controllers.

Advantageously, a method is provided in which, in response to the switchover between a performance mode and a comparison mode, a new configuration of at least one interrupt controller is realized by transferring information from the storage element to at least one interrupt controller.

A method is expediently provided in which the total configuration information of at least one interrupt controller is transferred from the storage element.

Advantageously, a method is provided in which the information is utilized for configuring at least one interrupt controller.

A method is expediently provided in which interrupts are triggered simultaneously in a comparison mode.

Advantageously, a method is provided in which, in the switchover from a performance mode to a comparison mode, the same information is transferred from the storage element to at least two interrupt controllers.

BRIEF DESCRIPTION OF THE VARIOUS VIEWS OF THE DRAWING

Figure 5:
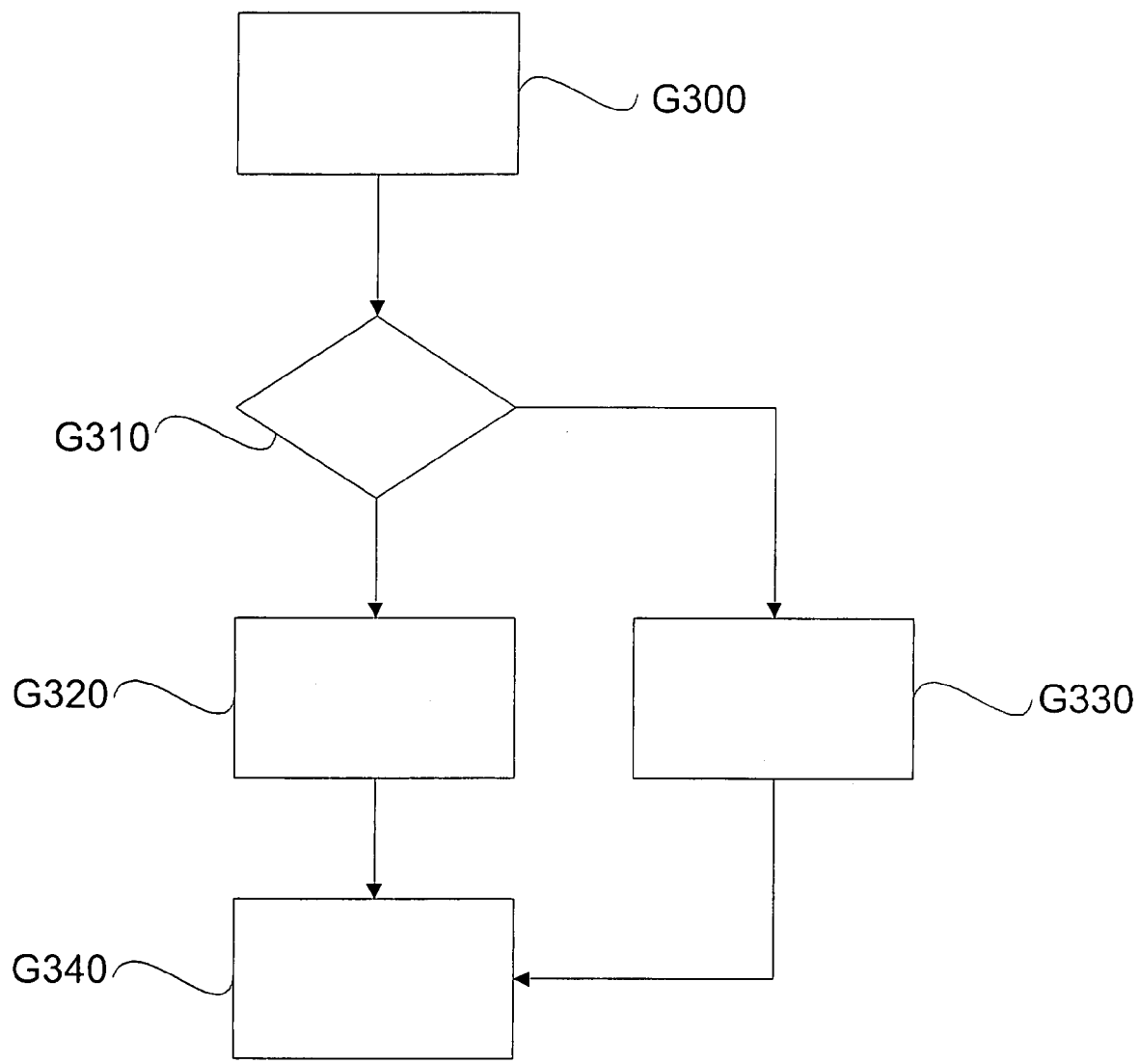

FIG. 5, in a flowchart, shows a method which, within a special pipeline level G230a, G230b, exchanges a special undefined bit combination with an NOP (no operation) or other neutral bit combination.

Figure 6:
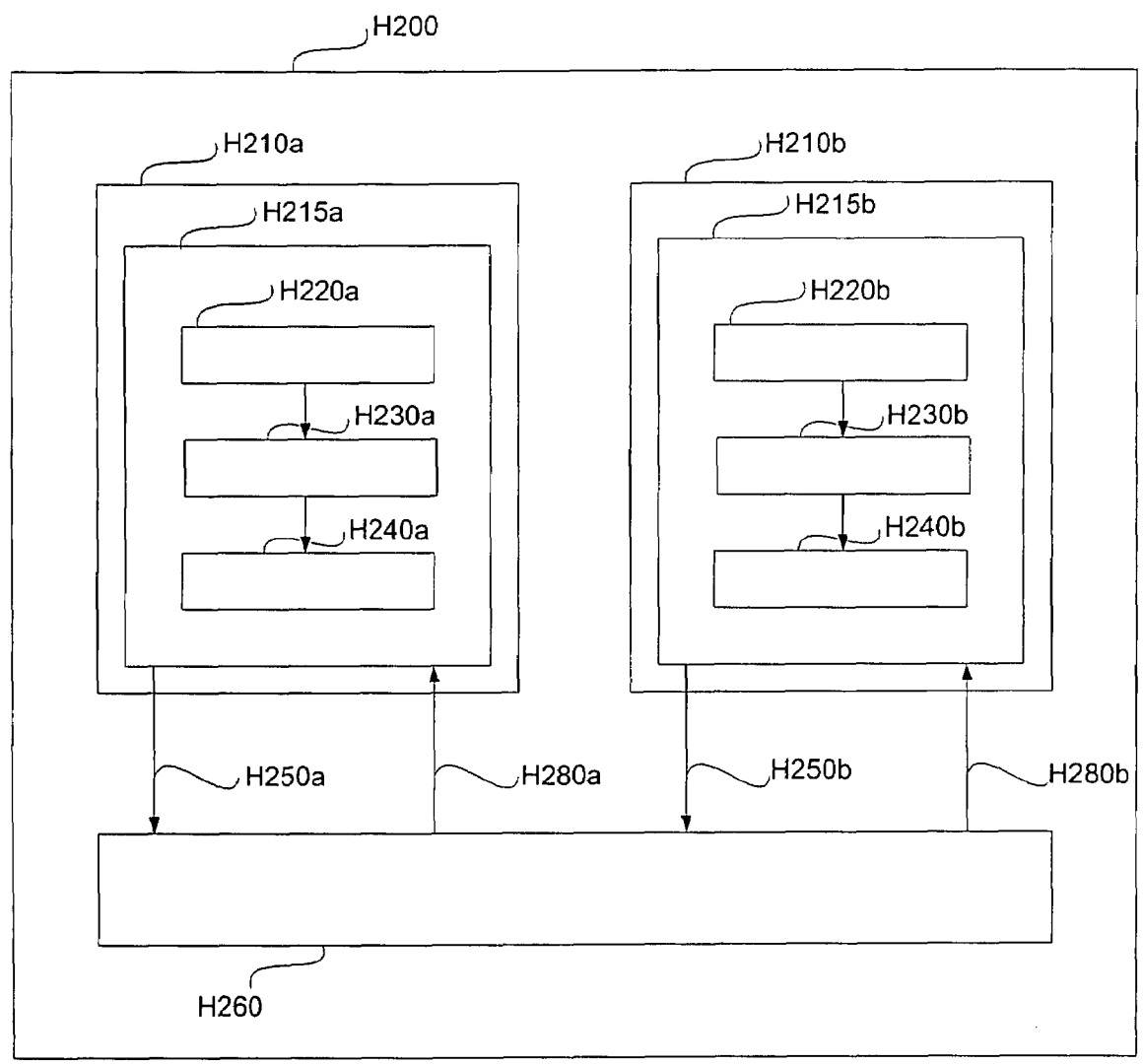

FIG. 6 shows a multiprocessor system H200 having two execution units H210a, H210b and a switchover and comparison unit H260.

Figure 7:
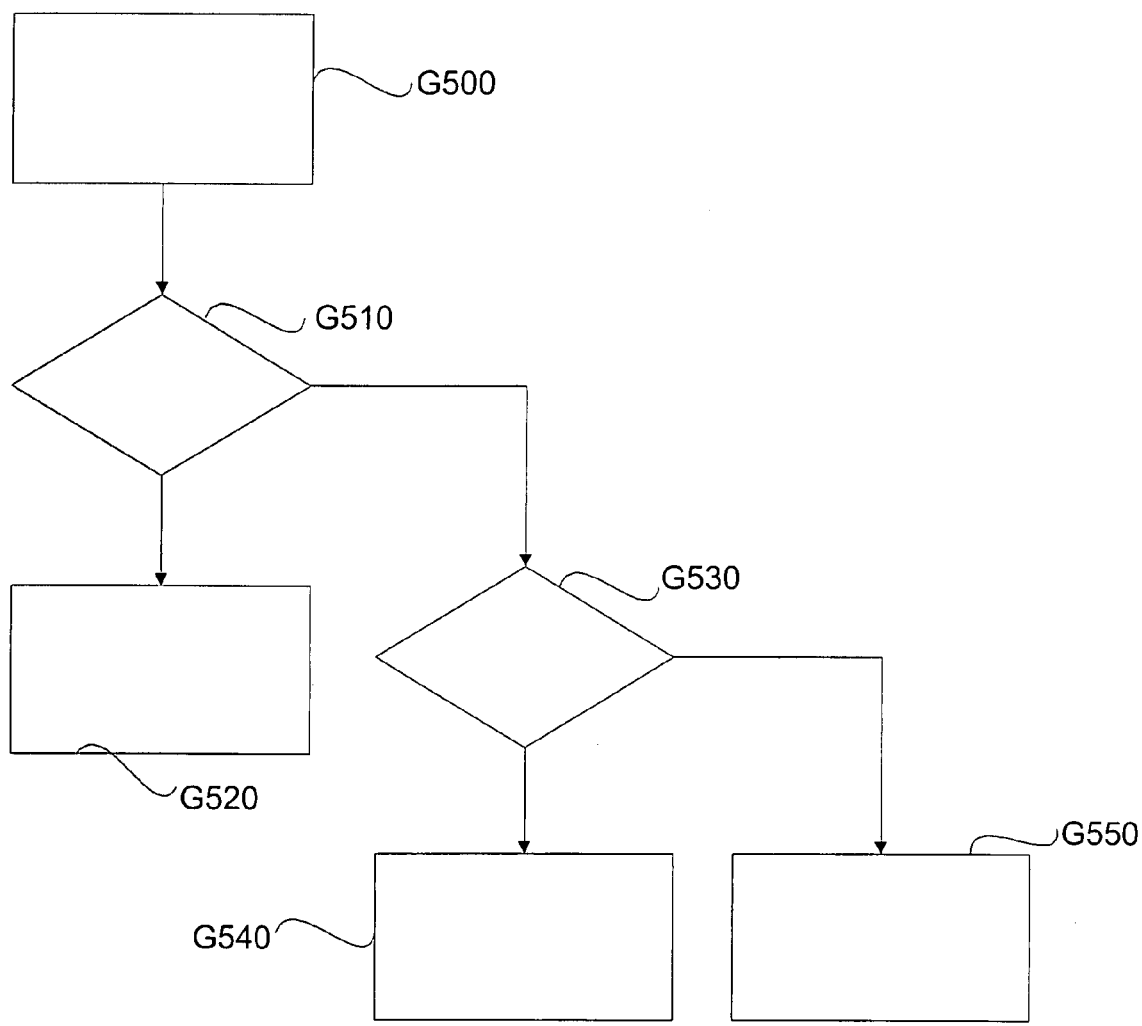

FIG. 7, in a flowchart, shows a method that indicates how, with the aid of the unit ID, the program flow can be separated upon the change from a comparison mode to a performance mode in a multiprocessor system having 2 execution units.

Figure 8:
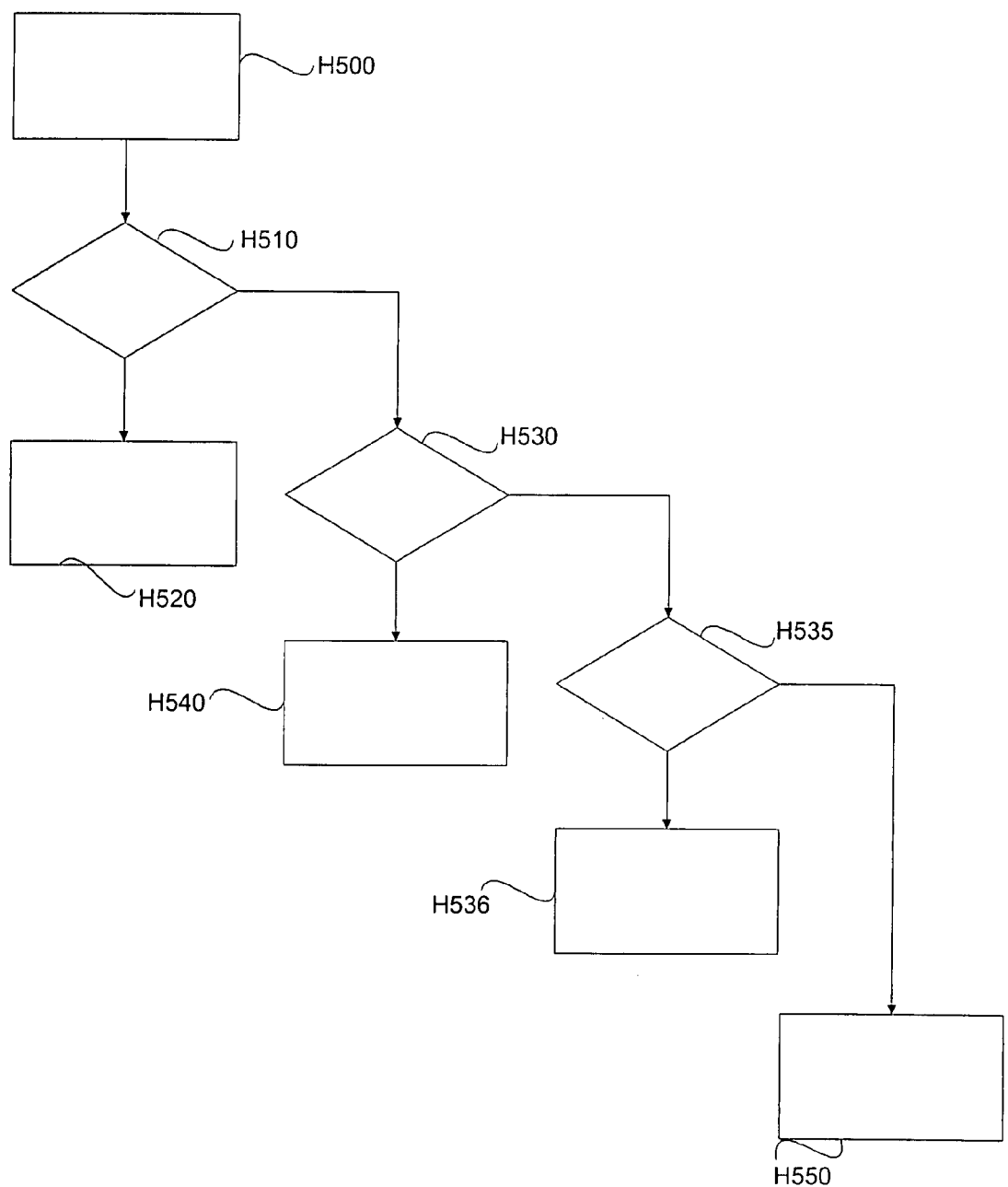

FIG. 8 shows one example method as to how, with the aid of the unit ID, the program flow can be separated upon the change from a comparison mode to a performance mode in a multiprocessor system having 3 execution units.

Figure 9:
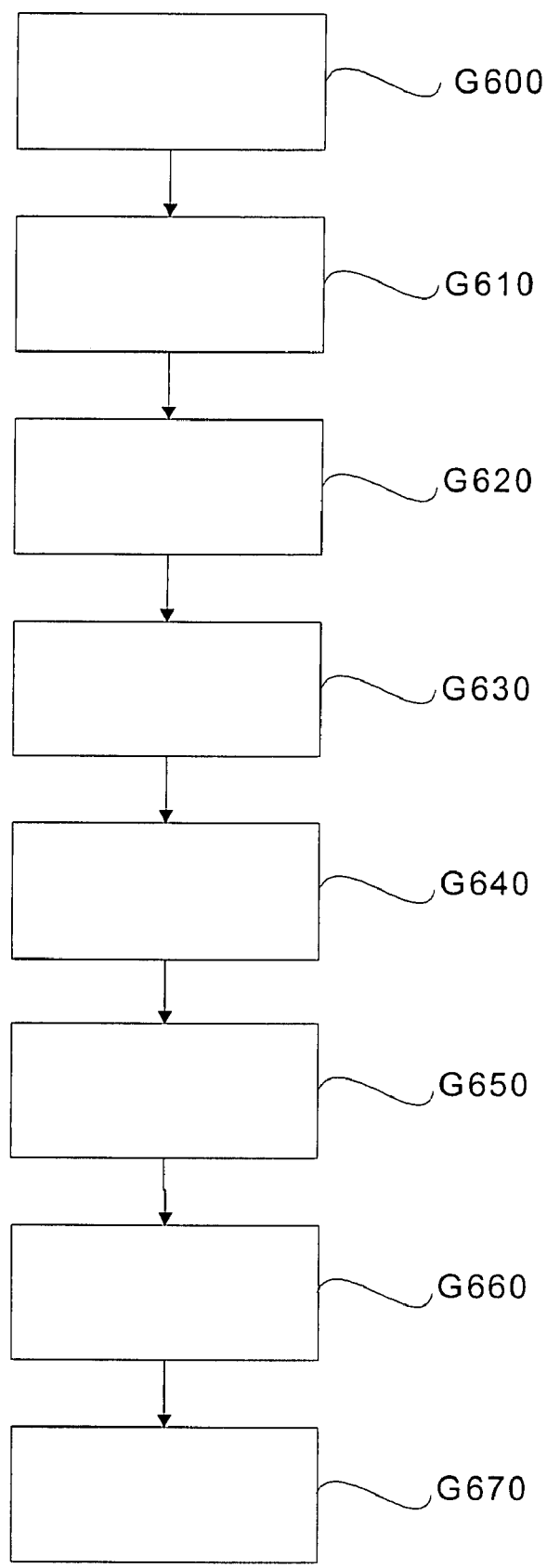

FIG. 9, in a flowchart, shows a method which synchronizes the execution units in response to the switchover from the performance mode to the comparison mode.

Figure 10:
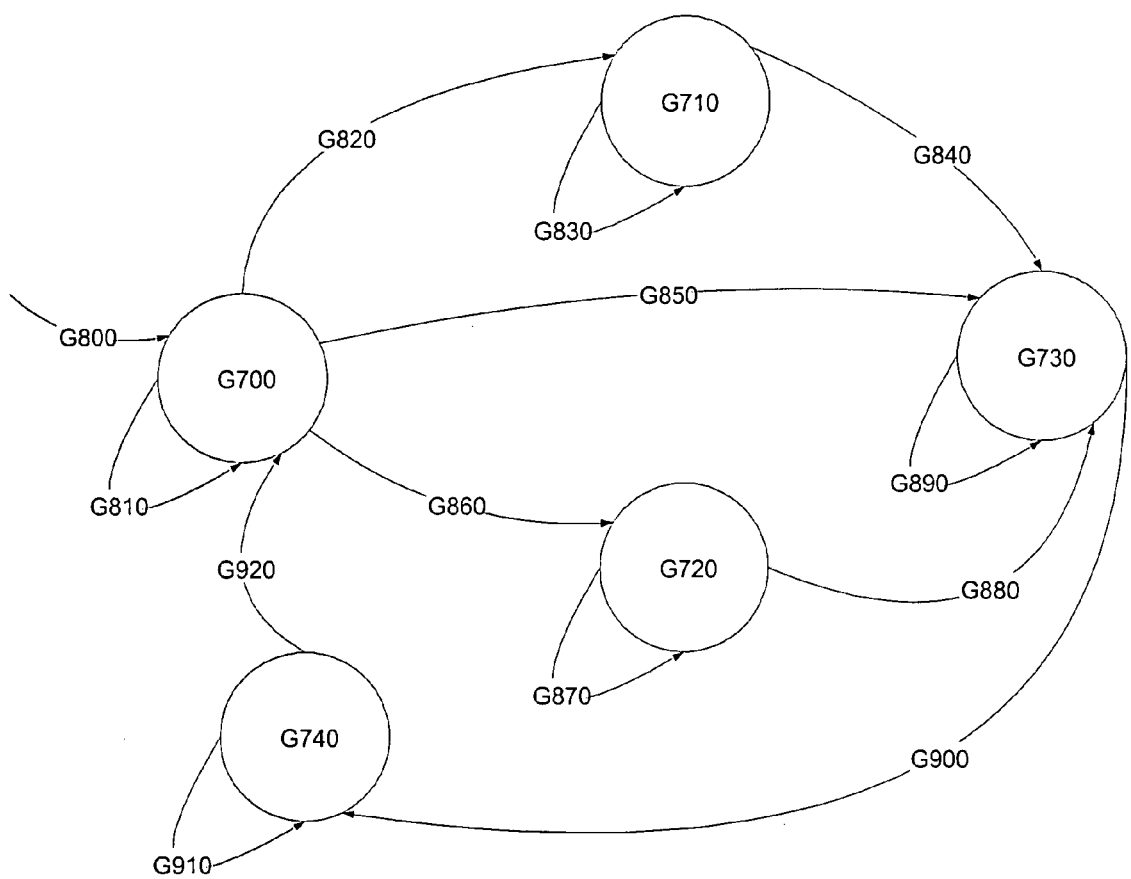

FIG. 10 shows a finite state machine which represents the switchover between a performance and a comparison mode.

Figure 11:
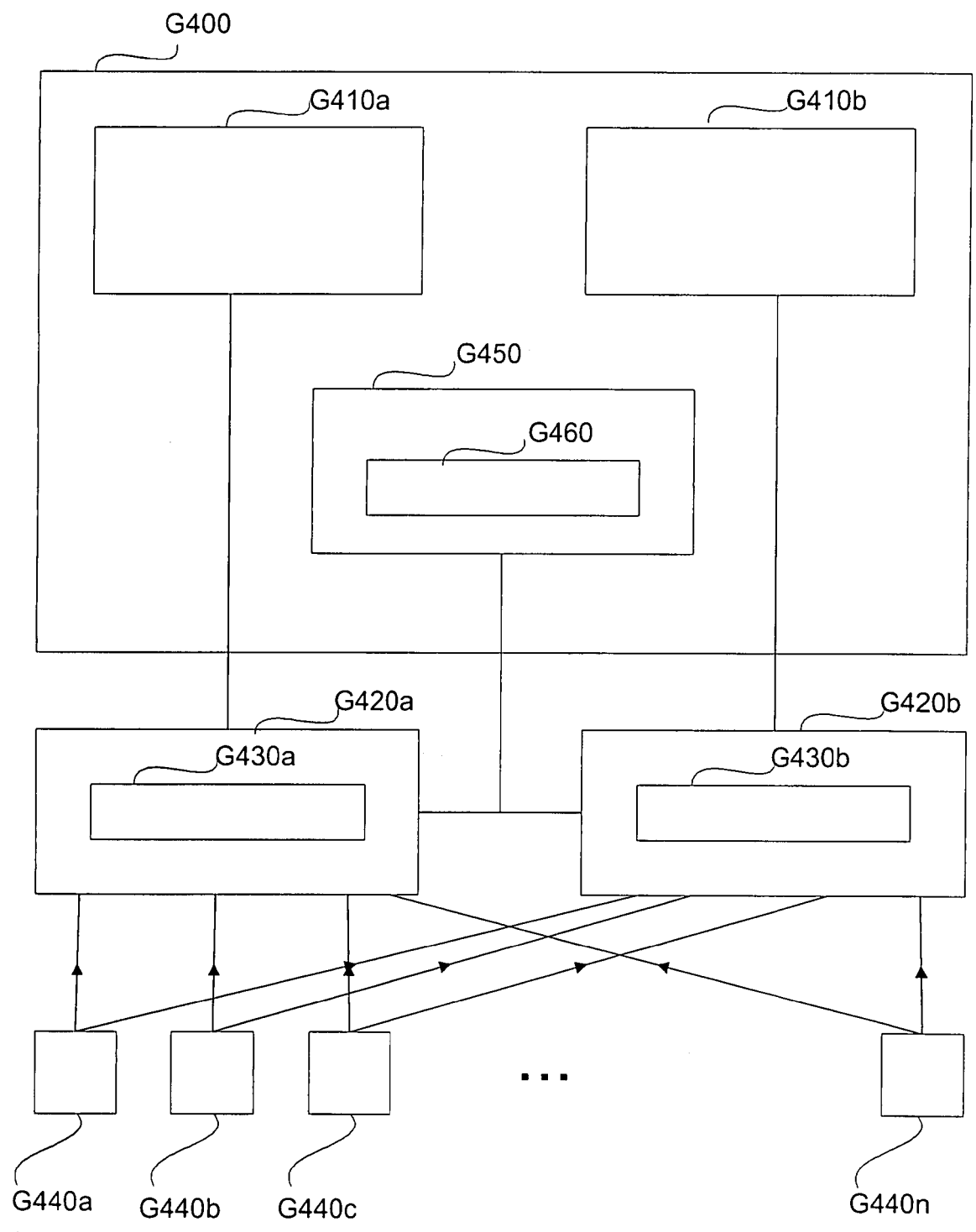

FIG. 11 shows a multiprocessor system G400 having two execution units as well as two interrupt controllers G420a, G420b, including interrupt masking registers G430a, G430b contained therein and various interrupt sources G440a through G440n.

Figure 12:
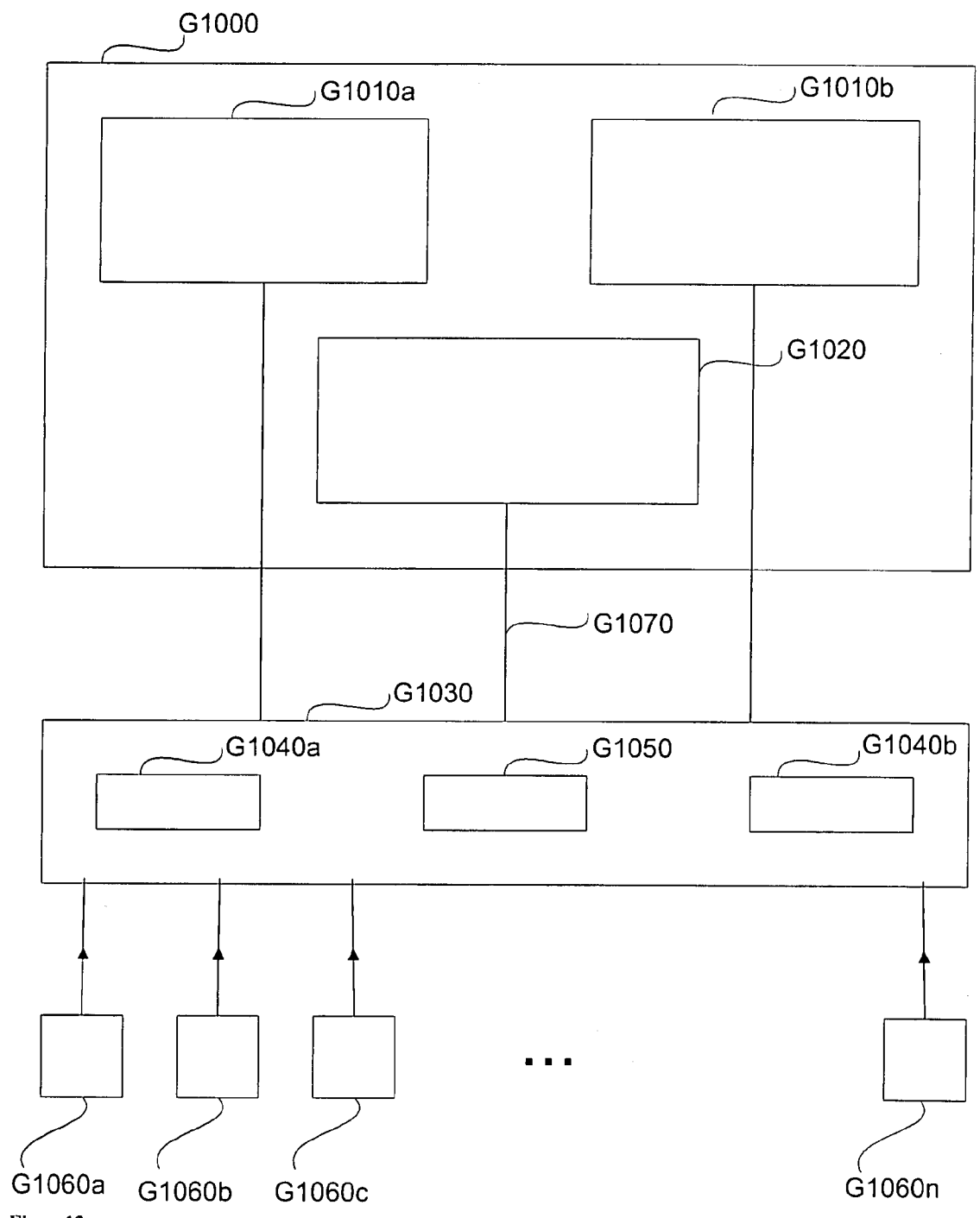

FIG. 12 shows a multiprocessor system having two execution units, a switchover and comparison unit and an interrupt controller having three register records.

Figure 13:
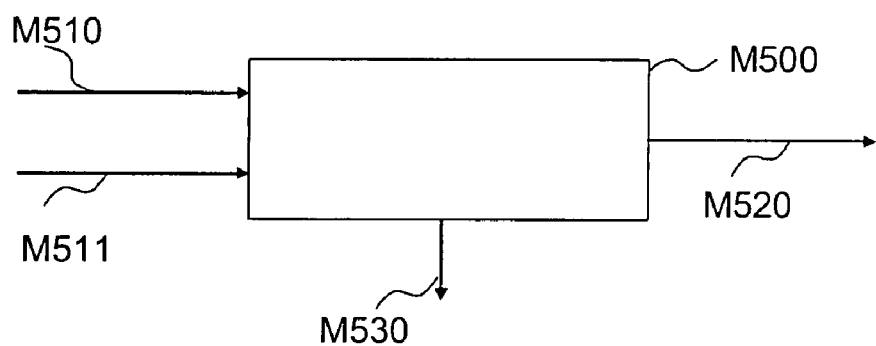

FIG. 13 shows an example form of a comparator.

Figure 14:
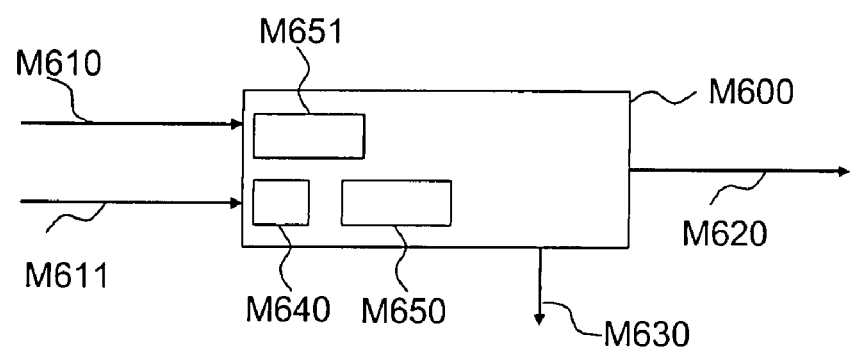

FIG. 14 shows a comparator having a unit to compensate for a phase shift.

Figure 15:
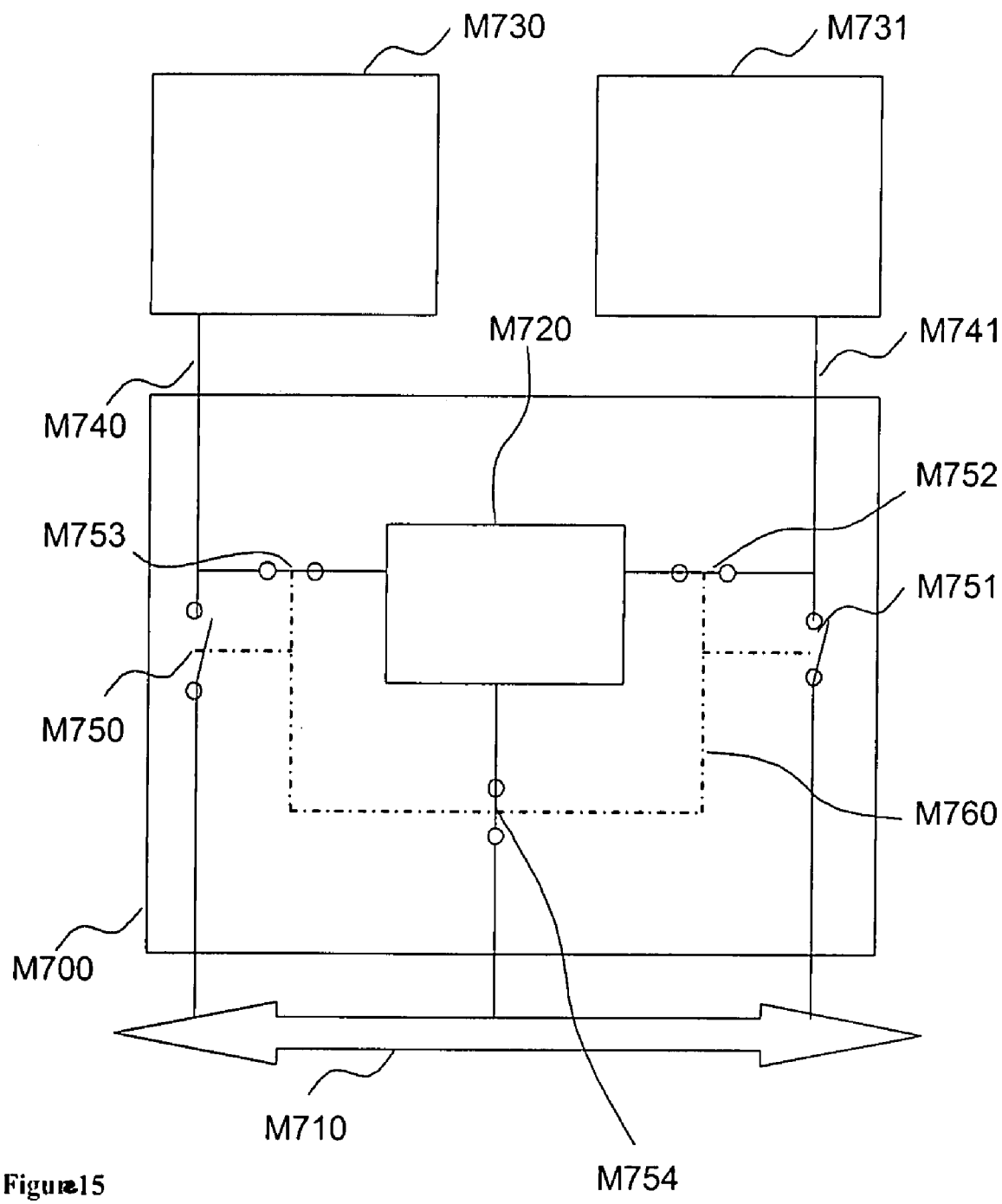

FIG. 15 depicts the behavior in principle of preferred component M700 (switchover and comparison unit) in the comparison mode.

Figure 16:
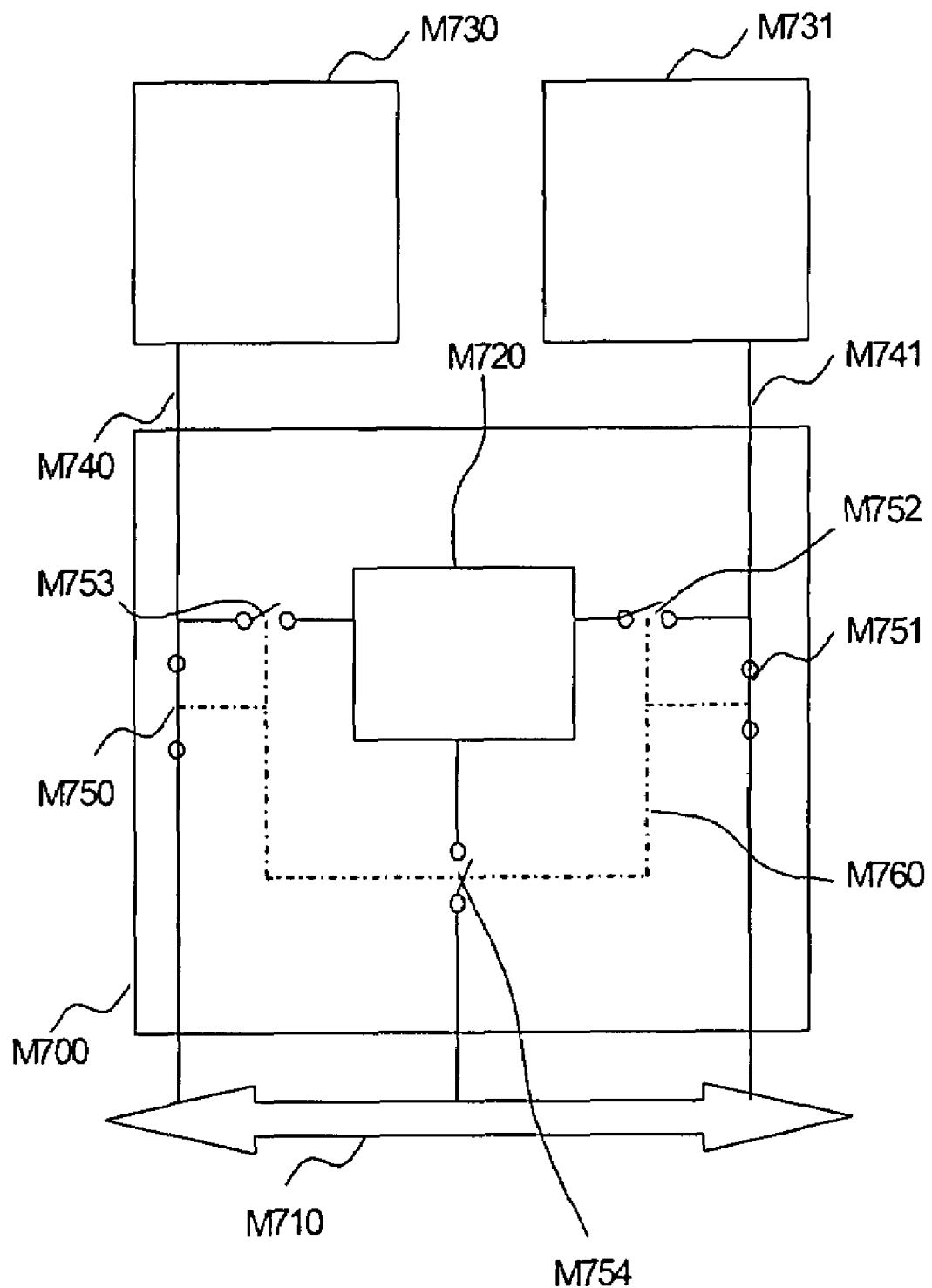

FIG. 16 depicts the behavior in principle of preferred component M700 (switchover and comparison unit) in the performance mode.

Figure 17:
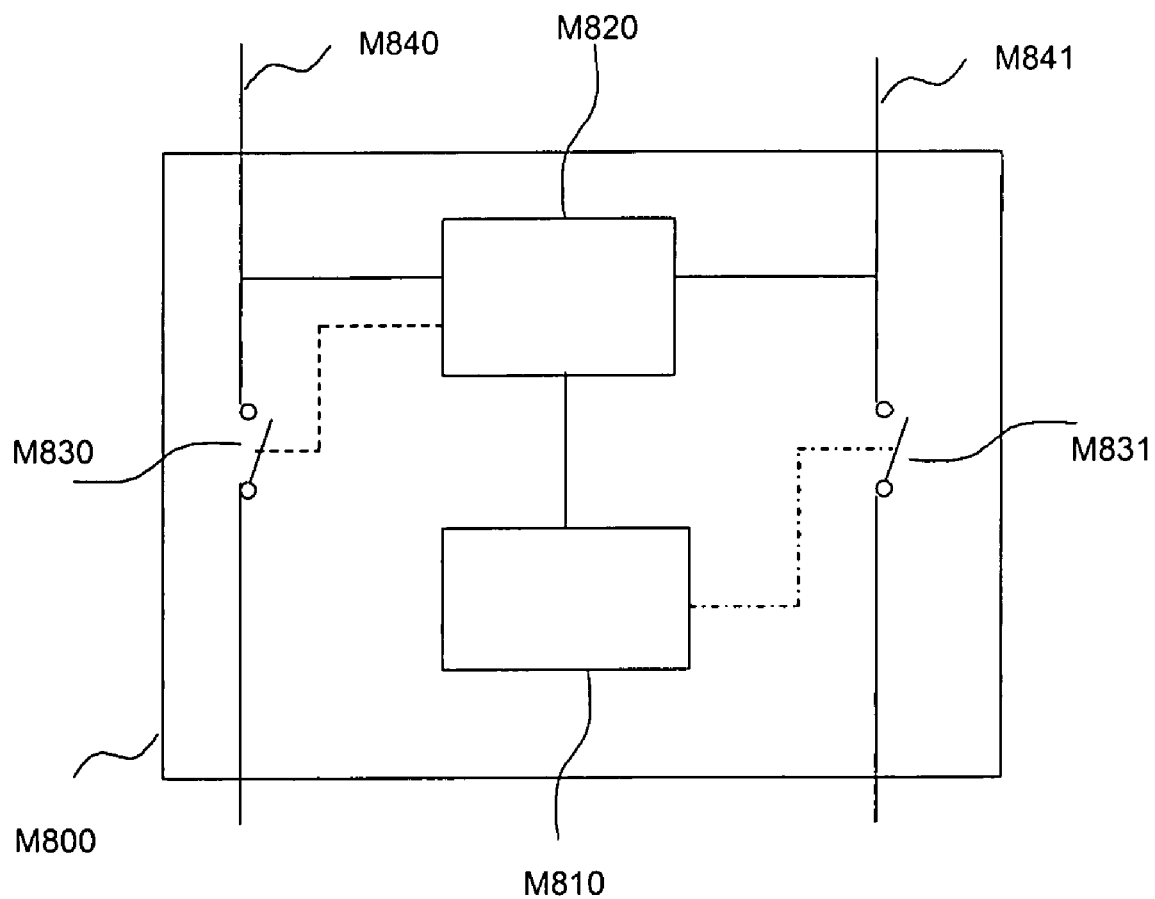

FIG. 17 shows an example embodiment of the switchover and comparison unit.

Figure 18:
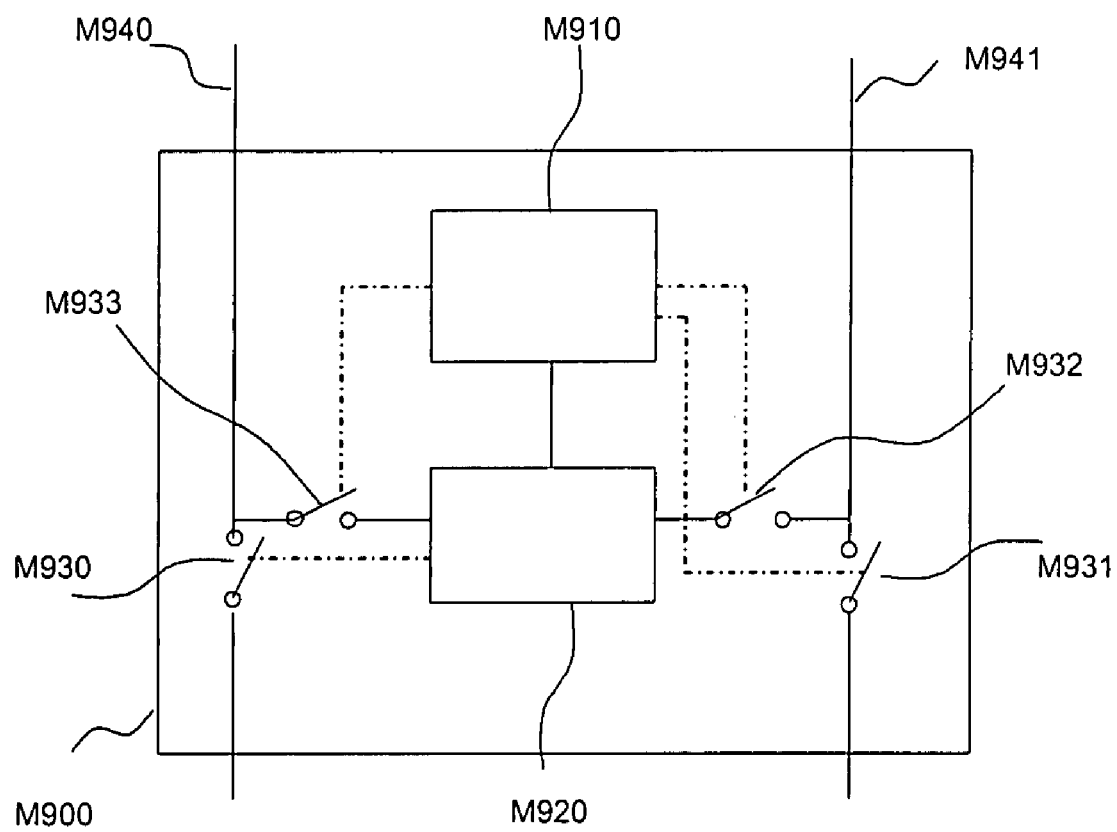

FIG. 18 shows another example embodiment of the switchover and comparison unit.

Figure 19:
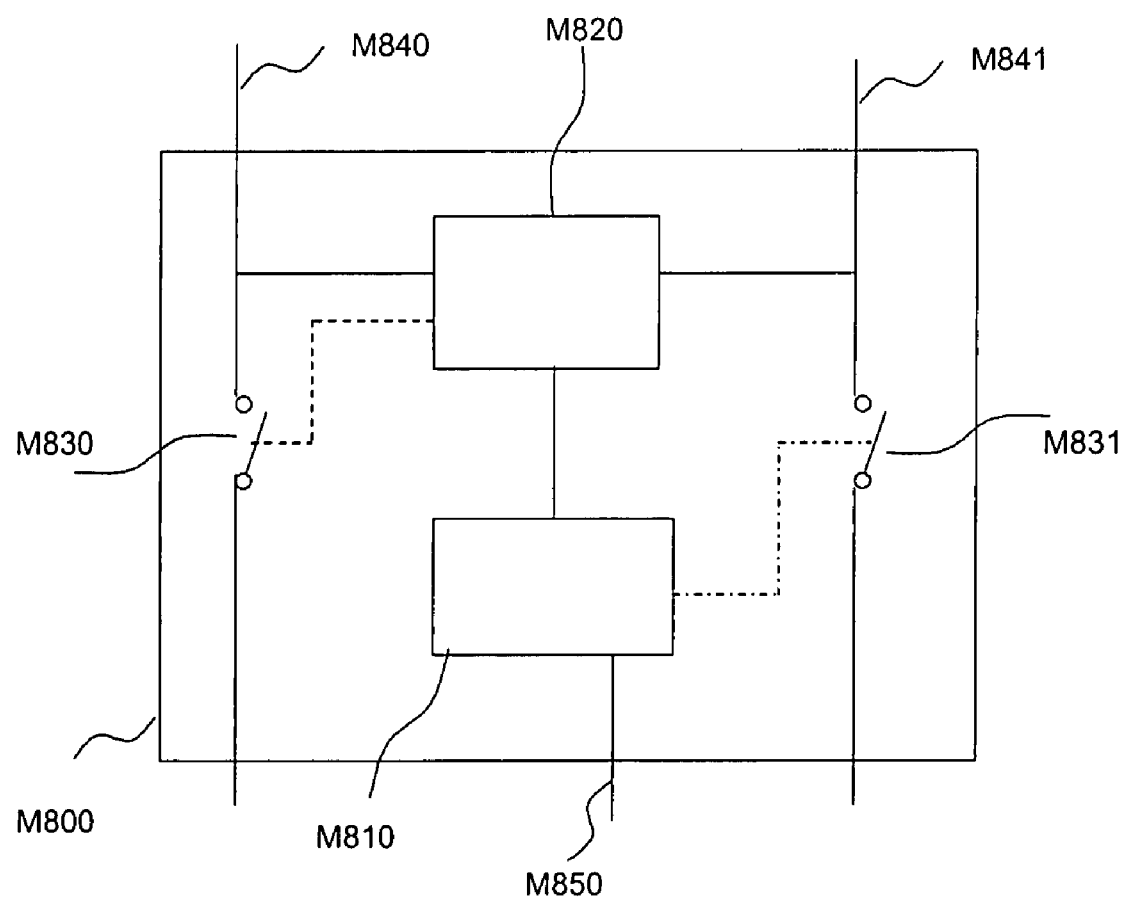

FIG. 19 shows a switchover and comparison unit which generates a mode signal.

Figure 20:
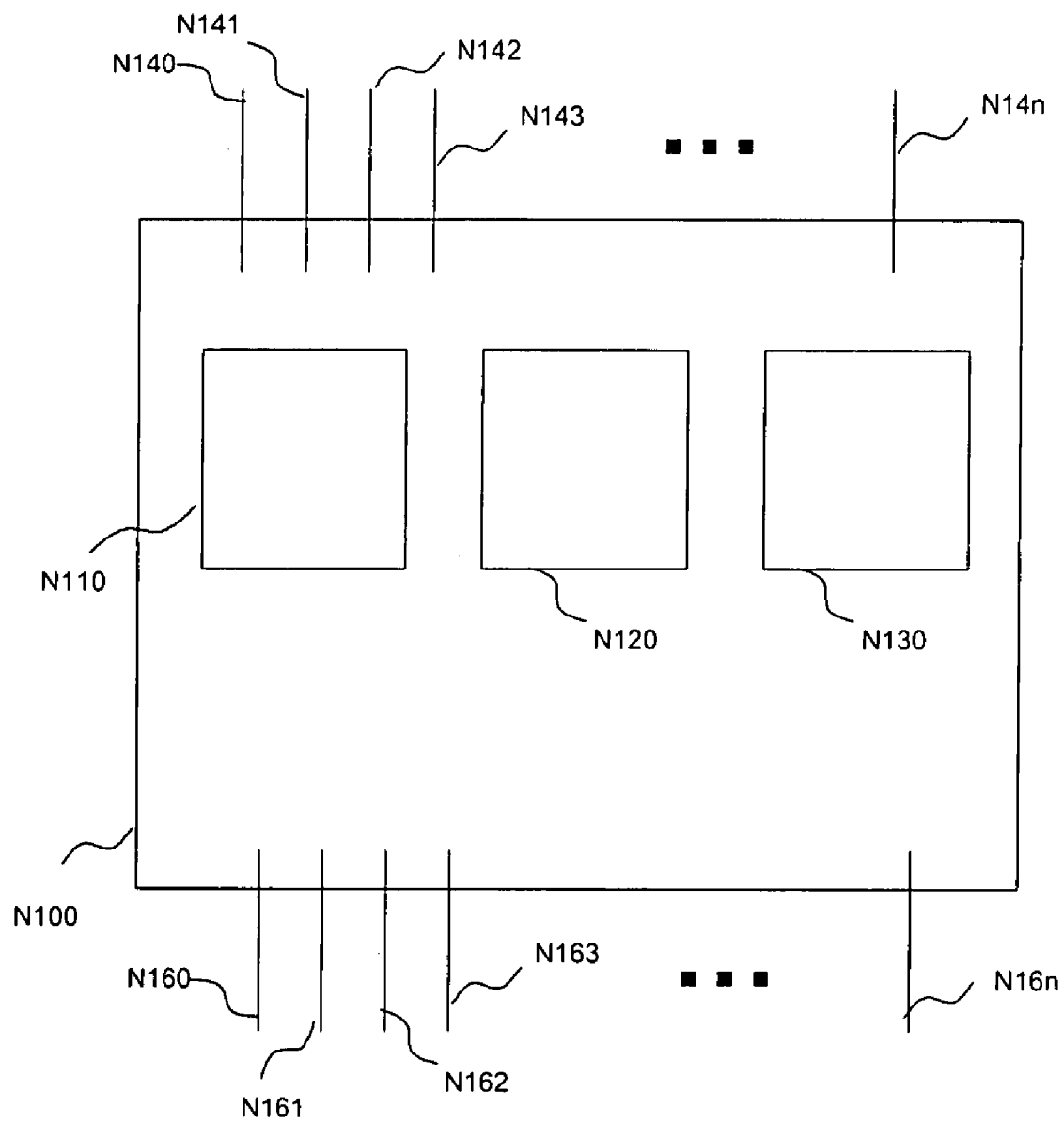

FIG. 20 shows a general depiction of a switchover and comparison unit.

Figure 21:
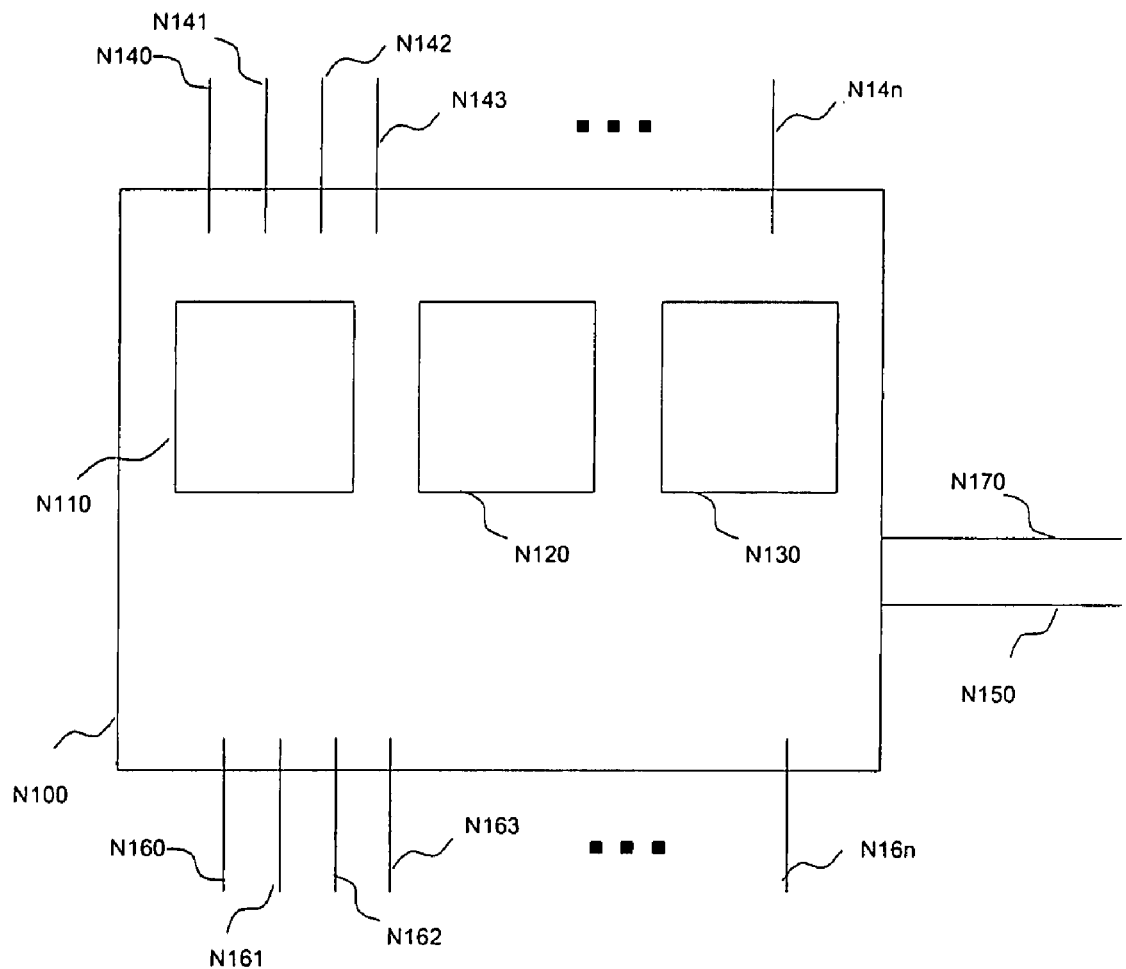

FIG. 21 shows a general depiction of a switchover and comparison unit which generates a general mode and a general fault signal.

Figure 22:
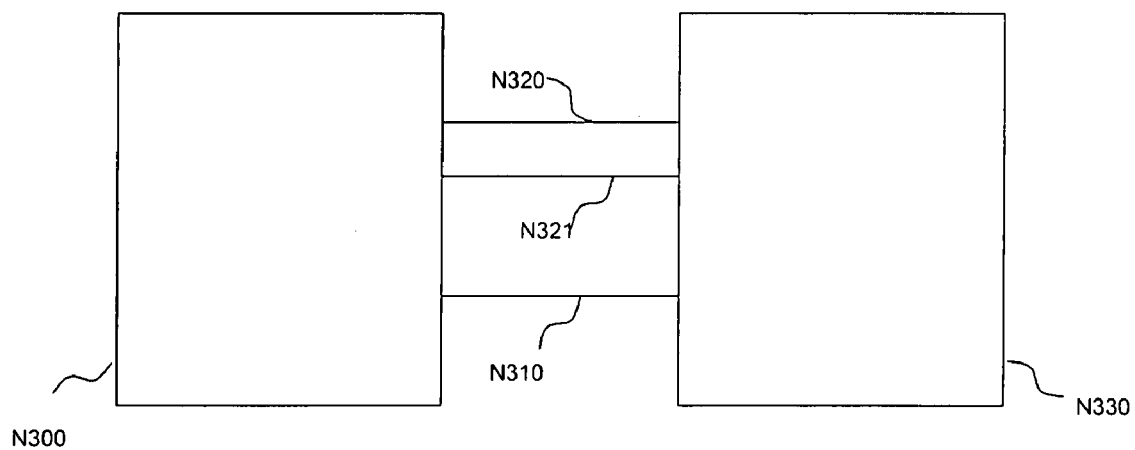

FIG. 22 shows the query/reply communication with an external unit.

Figure 23:
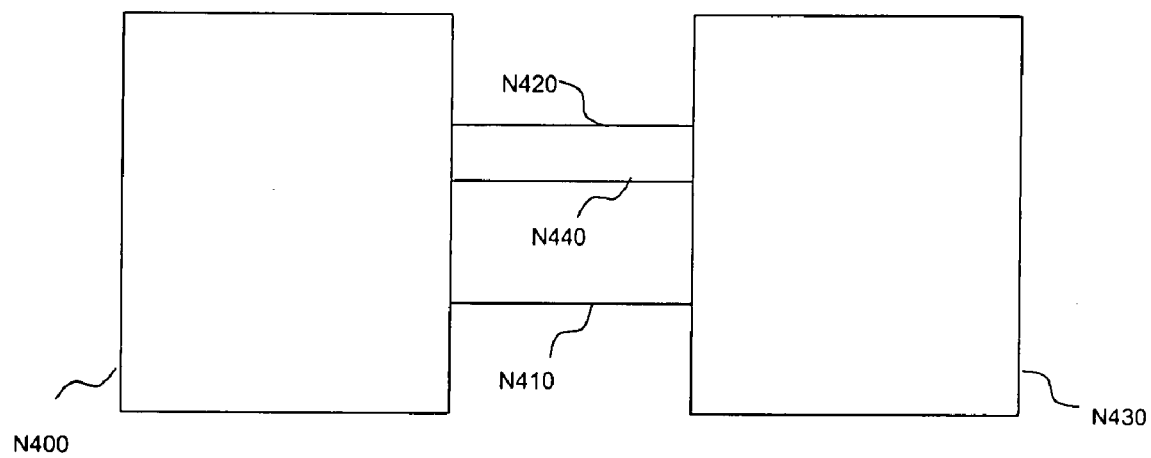

FIG. 23 shows the communication with an intelligent actuator.

DETAILED DESCRIPTION OF THE INVENTION

In the following, both a processor, a core, a CPU, as well as an FPU (floating point unit), a DSP (digital signal processor), a coprocessor or an ALU (arithmetic logical unit) may be denoted as execution unit.

Figure 1:
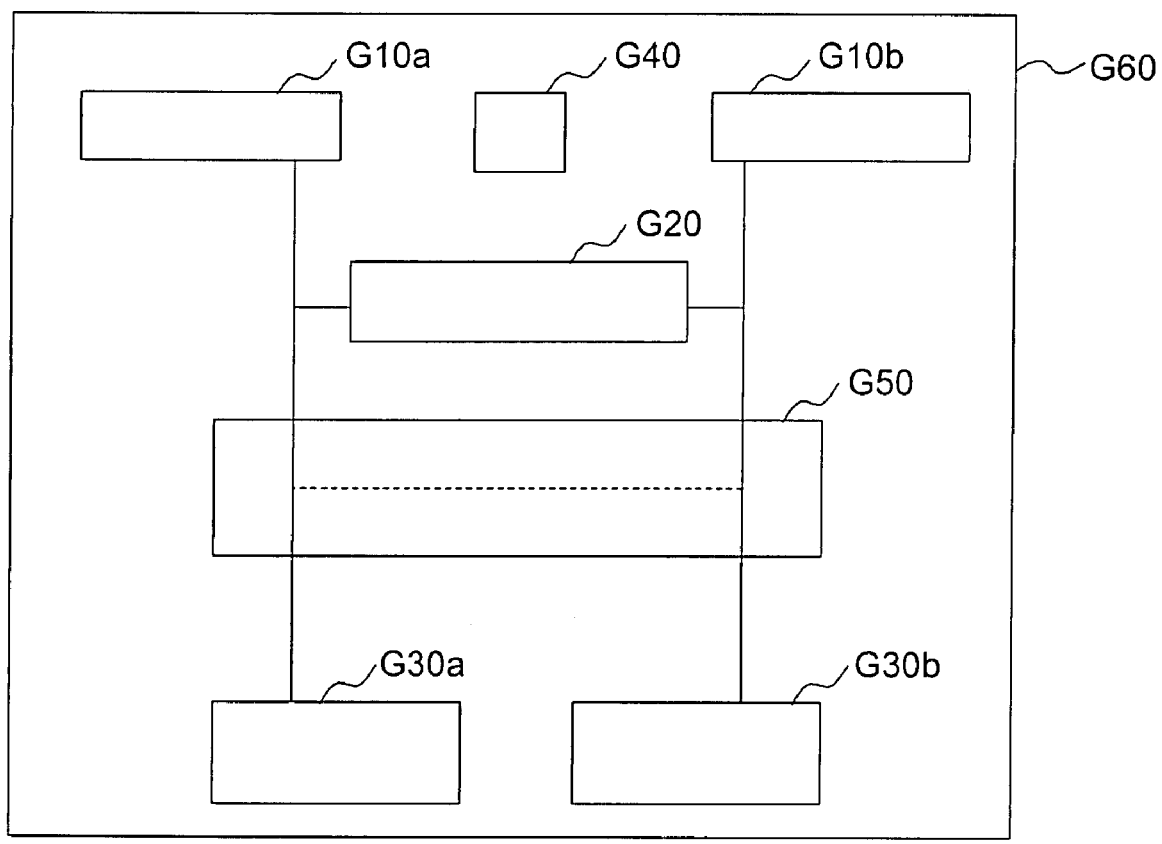
FIG. 1 shows a multiprocessor system G60 having two execution units G10a, G10b, a comparison unit G20, a switchover unit G50 and a unit for recognizing a switchover request G40.

FIG. 1 shows a multiprocessor system G60 having two execution units G10a, G10b, a comparison unit G20, a switchover unit G50 and a unit for recognizing a switchover request G40.

Figure 2:
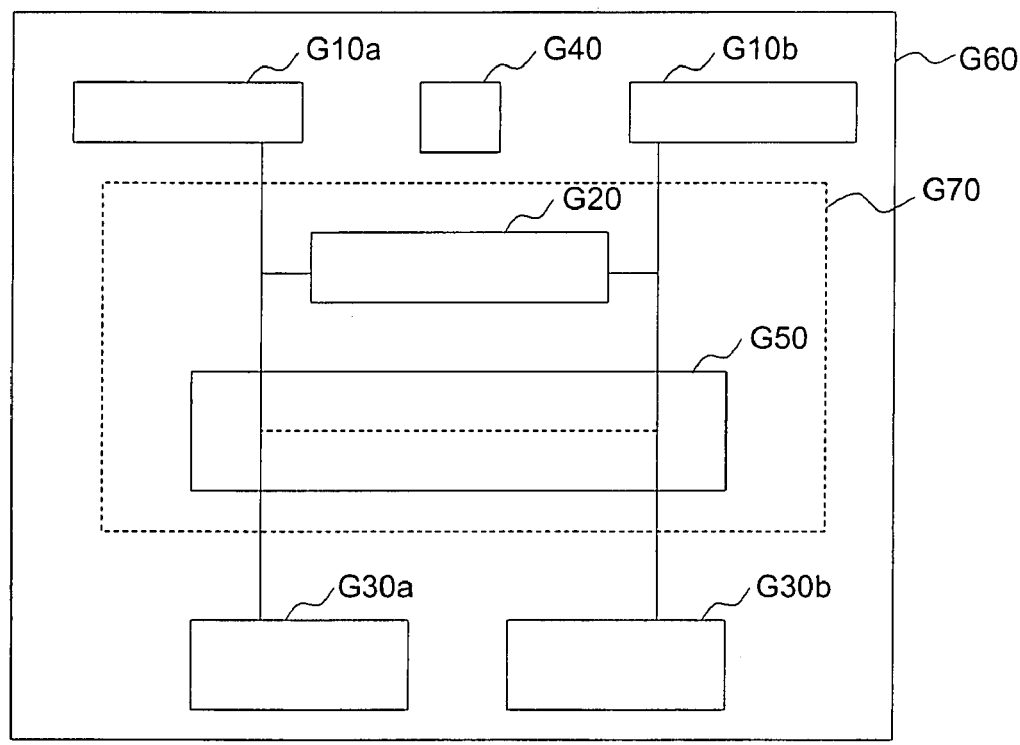
FIG. 2 shows a multiprocessor system G60 having two execution units G10a, G10b, a combined comparison and switchover unit G70 made up of a comparison unit G20 and a switchover unit G50, as well as a unit for recognizing a switchover request G40.
Figure 3:
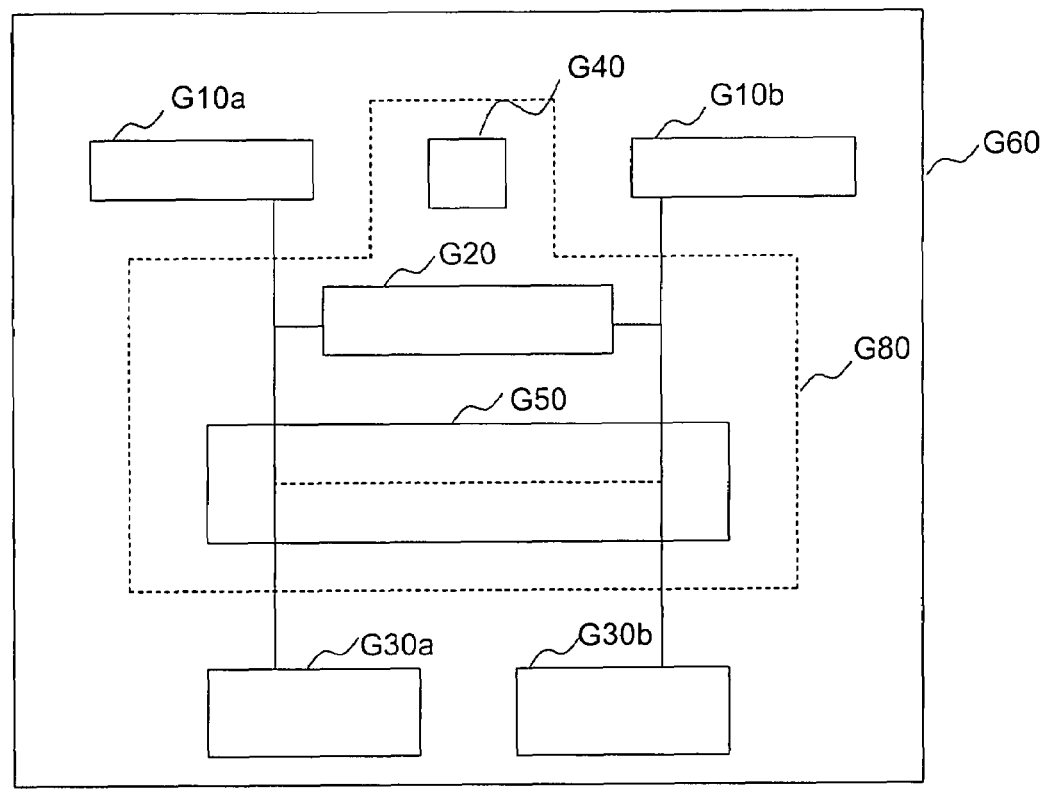
FIG. 3 shows a multiprocessor system G60 having two execution units G10a, G10b, and a combined switchover request recognition, comparison and switchover unit G80 made up of a comparison unit G20, a switchover unit G50 and a unit for recognizing a switchover request G40.

The present invention relates to a multiprocessor system G60 shown in FIG. 1, FIG. 2 and FIG. 3, having at least two execution units G10a, G10b, a comparison unit G20, a switchover unit G50 and a unit for recognizing a switchover request G40. Switchover unit G50 has at least two outputs to at least two system interfaces G30a, G30b. Registers, memories or peripherals such as digital outputs, digital-to-analog converters, communication controllers are able to be controlled via these interfaces. This multiprocessor system is able to be operated in at least two operating modes, a comparison mode (CM) and a performance mode (PM).

In the performance mode, different commands, program segments or programs are executed in parallel in the different execution units. In this operating mode, comparison unit G20 is deactivated. In this operating mode, switchover unit G50 is configured in such a way that each execution unit G10a, G10b is connected to a system interface G30a, G30b. In this context, execution unit G10a is connected to system interface G30a, and execution unit G10b is connected to system interface G30b.

In the comparison mode, identical or substantially identical commands, program segments or programs are processed in both execution units G10a, G10b. These commands are advantageously processed in clock-controlled synchronism, but processing with asynchronism or a defined clock pulse offset is also conceivable. The output signals of execution units G10a, G10b are compared in comparison unit G20. In response to a difference, a fault is imposed and suitable measures can be taken. These measures may include the triggering of a fault signal, initiating a fault-handling procedure, the actuation of switches, or may be a combination of these and other conceivable measures. In one variation, switchover unit G50 is configured in such a way that only one signal is put through to system interfaces G30a, G30b. In another configuration, the switchover unit causes only the compared and therefore identical signals to be put through to system interfaces G30a, G30b.

Independently of the mode active at the moment, switchover-request recognition unit G40 detects a desire to switch to another mode.

FIG. 2 shows a multiprocessor system G60 having two execution units G10a, G10b, a combined comparison and switchover unit G70 made up of a comparison unit G20 and a switchover unit G50, as well as a unit for recognizing a switchover request G40.

In one example embodiment of the facts described above, switchover unit G50 and comparison unit G20 may be combined to form one common switchover and comparison unit (SCU) G70, as shown in FIG. 2. This common component G70 then takes over the tasks of individual components G50, G20. FIGS. 15, 16, 17, 18 and 19 show embodiment variants of SCU G70.

In another example embodiment as shown in FIG. 3, the unit for recognizing a switchover request G40, comparator G20 and switchover unit G50 may be combined in one common component G80. In a further specific embodiment not shown in a figure, switchover request recognition unit G40 and comparator G20 may be combined in one common component. A combination of switchover request recognition unit G40 with switchover unit G50 in one common component is likewise conceivable.

If not otherwise indicated, in the further text, it is assumed that a switchover request recognition unit G40 and a combined switchover and comparison unit G70 are present.

A general case of the switchover and comparison component, also for use for more than two execution units, is shown in FIG. 20. n signals N140, . . . , N14n go from the n execution units to be considered, to switchover and comparison component N100. It is able to generate up to n output signals N160, . . . , N16n from these input signals. In the simplest case, the "pure performance mode", all signals N14i are gated onto corresponding output signals N16i. In the opposite limiting case, the "pure comparison mode", all signals N140, . . . N14n are gated only onto exactly one of the output signals N16i.

Using this figure, it is possible to explain how the various conceivable modes can come about. To that end, this figure contains the logical component of a switching circuit logic N110. This component does not have to exist as a separate component. It is crucial that the functions described be realized in the system. Switching circuit logic N110 first of all determines how many output signals there actually are. It also determines which of the input signals contribute to which of the output signals. In this context, one input signal can contribute to exactly one output signal. Thus, phrased differently in mathematical form, the switching circuit logic defines a function which assigns one element of quantity {N160, . . . , N16n} to each element of quantity {N140, . . . , N14n}.

Processing logic N120 then determines for each of the outputs N16i, in what form the inputs contribute to this output signal. This component also does not have to exist as a separate component. Again, it is crucial that the functions described be realized in the system. To describe the different variation possibilities by way of example, let us assume, without limiting the universality, that output N160 is produced by signals N141, . . . , N14m. If m=1, this corresponds simply to a through-connection of the signal; if m=2, then signals N141, N142 are compared as described, for example, in the comparator in FIG. 13 and FIG. 14. This comparison may be performed synchronously or asynchronously; it may be performed bitwise or only for significant bits or also with a tolerance range.

If m>=3, there are several possibilities.

A first possibility is to compare all signals and, given the presence of at least two different values, to detect a fault which optionally may be signaled.

A second possibility is to make a k from m-selection (k>m/2). This may be implemented by using comparators. Optionally, a fault signal may be generated when one of the signals is recognized as deviating. A fault signal, possibly different from it, may be generated when all three signals are different.

A third possibility is to supply these values to an algorithm. For example, this may represent the formation of a mean, a median or the use of a fault-tolerant algorithm (FTA). Such an FTA is based on discarding extreme values of the input values and performing a type of averaging over the remaining values. This averaging may be carried out over the entire quantity of remaining values, or preferably over a partial quantity to be formed easily in HW. In this case, it is not always necessary to actually compare the values. For example, in determining the average, it is only necessary to add and divide; FTM, FTA or median require a partial sorting. Given sufficiently large extreme values, as an option, a fault signal may be output here as well, if desired.

These various indicated possibilities for processing a plurality of signals to form one signal are known for short as comparison operations.

The task of the processing logic is thus to determine the exact form of the comparison operation for each output signal—and therefore also for the associated input signals. The combination of the information from switching circuit logic N110 (i.e., the aforesaid function) and from the processing logic (i.e., the determination of the comparison operation per output signal, that is, per functional value) constitutes the mode information, and it determines the mode. In the general case, this information is naturally multi-valued, that is, is not only representable via one logic bit. Not all theoretically conceivable modes are useful in a given implementation; one will limit the number of modes allowed. It should be emphasized that in the case of only two execution units, where there is only one comparison mode, the total information can be condensed onto only one logic bit.

In the general case, a switchover from a performance mode to a comparison mode is characterized in that execution units, which are mapped to various outputs in the performance mode, are mapped to the same output in the comparison mode. Preferably, this is realized in that there is a subsystem of execution units in which, in the performance mode, all input signals N14i which are to be taken into account in the subsystem are switched directly to corresponding output signals N16i, while in the comparison mode, they are all mapped to one output. Alternatively, such a switchover may also be implemented by altering pairings. It is thereby clarified that, in the general case, one cannot speak of the one performance mode and the one comparison mode, although in a given form of the invention, it is possible to limit the quantity of modes allowed, so that this is the case. However, one can always speak of a switchover from a performance mode to a comparison mode (and vice versa).

Controlled by software, it is possible to switch dynamically between these modes during operation. In this context, the switchover is triggered either by the execution of special switchover instructions, special instruction sequences, explicitly identified instructions or by the access to specific addresses by at least one of the execution units of the multiprocessor system.

Fault circuit logic N130 collects the fault signals generated, for example, by the comparators, and optionally, can switch outputs N16i to passive by interrupting them via a switch, for instance.

However, for the most part, the following examples concentrate on the case of two execution units, based on which most concepts can be presented more easily.

The switchover between the modes may be coded by various methods. In one possible method, special switchover commands may be used, which are detected by the unit for recognizing a switchover request G40. Another possible method for coding the switchover is defined by the access to a special memory area, which is again detected by the unit for recognizing a switchover request G40. A further method interprets an external signal, which signals a switchover, in the unit for recognizing a switchover request G40. In the following, a method is described which utilizes bit combinations not used in the existing instruction set of the processor. A special advantage of this method is that existing program development environments (assembler, compiler, linker, debugger) may continue to be used.

Figure 4:
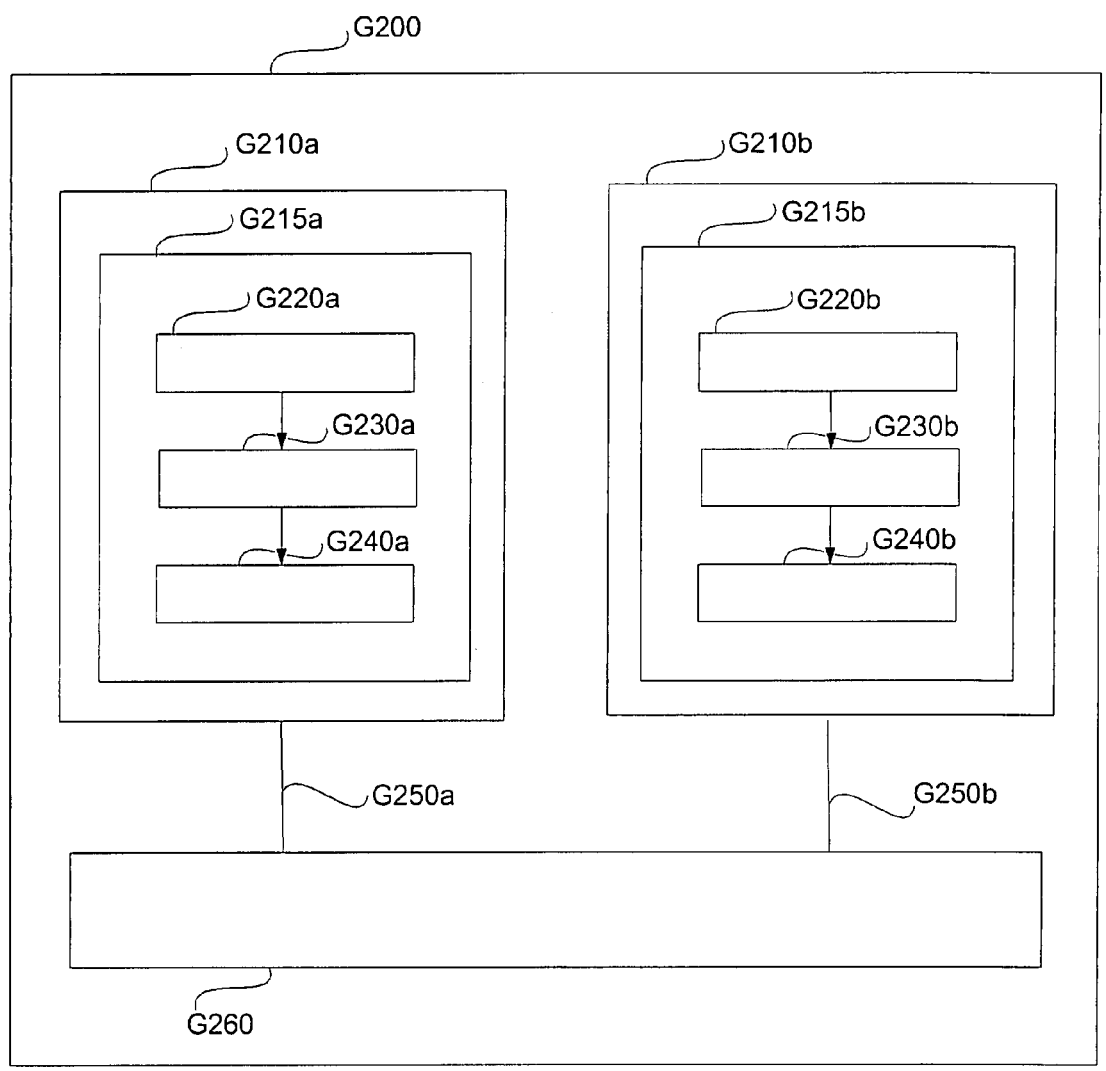
FIG. 4 shows a multiprocessor system G200 having two execution units G210a, G210b, and a switchover and comparison unit G260.

FIG. 4 shows a multiprocessor system G200 having two execution units G210a, G210b and a switchover and comparison unit G260. To switch between a comparison mode and a performance mode (and vice versa), bit combinations of the at least two execution units G210a, G210b not defined in the assembler are used. To be understood as not defined or undefined bit combinations in this sense, are all bit combinations which are specified as undefined or illegal in the description of the instruction set. They are, for example, illegal operand, illegal instruction, illegal operation. A general feature of these undefined bit combinations is that a normal execution unit either generates a fault signal or exhibits a non-defined behavior in the execution of such a bit combination. Thus, these bit combinations are not needed to describe the semantics of an ordinary program.

Therefore, the existing program development environment as it exists for single-processor systems may be used for the software development. This can be realized, for example, by defining a macro "SWITCH MODE TO PM" and a macro "SWITCH MODE TO CM" which inserts corresponding bit combinations, undefined in the sense defined above, at a suitable place in the code.

The use of this combination is then defined as a general "SWITCH" macro. Depending on the present mode, this macro then brings about a change to the respective other mode. If more than two different modes exist in the system, more such combinations must be available to use this method; one per mode may then be used for the switchover identification.

According to the present invention, the switchover request is coded by a bit combination not defined in the instruction set. It must not be processed within an execution unit G210a G210b in the usual manner. For this reason, an additional pipeline level (REPLACE level) G230a, G230b is provided, which recognizes the corresponding bit combinations and replaces them by neutral bit combinations for further processing.

The "NOP" (No Operation) instruction is advantageously used for that purpose. A NOP instruction has the feature that it does not alter the internal state of the execution unit, except for the instruction pointer. In this context, REPLACE level G230a, G230b is inserted after the usual first level, the FETCH level G220a G220b, and before remaining pipeline levels G240a, G240b, which are combined here in one unit.

According to the present invention, the implementation shown here of a unit for recognizing a switchover request G40 as a special pipeline level G230a, G230b in a pipeline unit G215a, G215b will generate an additional signal G250a, G250b when a corresponding bit combination for a switchover has been detected, that signals to a separate switchover unit and comparison unit G260 that the processing mode is to be changed.

REP levels G230a, G230b are disposed between FET levels G220a, G220b and remaining pipeline levels G240a, G240b in pipeline units G215a, G215b of execution units G210a, G210b. REP levels G230a, G230b recognize the corresponding bit combinations and, in this case, relay NOP instructions to remaining levels G240a, G240b. At the same time, respective signal G250a or G250b is activated. In all other cases, REP levels G230a, G230b behave neutrally, that is, all other instructions are passed on unchanged to remaining levels G240a, G240b.

FIG. 5, in a flowchart, shows a method which, within a special pipeline level G230a, G230b, exchanges a special undefined bit combination with a NOP or other neutral bit combination. In FETCH level G300, an instruction, that is, a bit combination, is fetched from the memory. Thereupon, in block G310, it is decided whether the fetched bit combination corresponds to the special undefined bit combination which codes a switchover. If this is not the case, in the next step G320, the bit combination is transferred without change to remaining pipeline levels G340 for further processing. If the special bit combination which codes a switchover has been recognized in step G310, in step G330, it is replaced by the NOP bit combination, and this is then transferred to further pipeline levels G340 for further processing. In one advantageous example embodiment, blocks G310, G320, G330 represent the functionality of a REPLACE level G230a, G230b according to the present invention; they may also include further functionality.

FIG. 6 shows a multiprocessor system H200 having two execution units H210a, H210b and a switchover and comparison unit H260. Components H220a, H220b, H240a, H240b have the same significance as G220a, G220b, G240a, G240b. In an alternative design of the unit for recognizing a switchover request G40 described here by special pipeline levels H230a, H230b, in addition to signals H250a, H250b which signal a switchover, it possesses further signals. To permit synchronization of execution units H210a, H210b upon the change from performance mode to comparison mode, pipeline units H215a, H215b of execution units H210a, H210b each have a signal input H280a, H280b by which the processing can be stopped. This signal is set by switchover and comparison unit H260 for that pipeline unit H215a or H215b which has recognized a switchover command first, and consequently has activated signal H250a or H250b.

Only when both pipeline units H215a, H215b of execution units H210a, H210b have recognized the switchover command and have synchronized their internal states by software or further hardware measures, is this signal H280a, H280b canceled again. H280a, H280b are not needed in the change from comparison mode to performance mode, since no synchronization is necessary.

A prerequisite for the suggestion described here is a unit (known as ID unit) or method via which each execution unit is able to ascertain its individual number or unit ID. For example, in a system having two execution units, one execution unit may ascertain for itself the number 0, the other the number 1. In a system having more than 2 execution units, the numbers are assigned or ascertained correspondingly. This ID does not differentiate between a comparison mode and a performance mode, but rather denotes an execution unit with one-to-one correspondence. The ID unit may be contained in the respective execution units, for example, implemented as a bit or bit combination in the processor status register or as a separate register or as a single bit or as a unit external to the execution units, which supplies a corresponding ID upon request.

After the execution units have switched to the performance mode in accordance with a switchover request, the comparison unit is indeed no longer active, but the execution units still execute the same instructions. This is due to the fact that the instruction pointers, which indicate the place in the program at which an execution unit will work in the next step or is working at present, are not influenced by the switchover. To permit the execution units to subsequently execute different SW modules, the program run of the execution units must be separated. Depending on the task, as a rule the instruction pointers therefore have different values in the performance mode, since according to the present invention, independent instructions, program segments or programs are processed. In the proposal described here, the program flows are separated by ascertaining the respective execution unit number. Depending upon which ID an execution unit possesses, the execution unit executes a specific software module. Since each execution unit has an individual number or ID, in this way the program flow of the participant execution units may be separated reliably.

FIG. 7, in a flowchart, shows a method that indicates how, with the aid of the unit ID, the program flow can be separated upon the change from a comparison mode to a performance mode in a multiprocessor system having 2 execution units. After the switchover from a comparison mode to a performance mode has been executed G500, a query of the unit ID or execution unit number G510 is performed by both execution units. According to the present invention, in so doing, execution unit 0 will receive execution unit number 0, and execution unit 1 will receive execution unit number 1. In G510, the ascertained execution unit number is compared to the number 0. If they are the same, in step G520, the execution unit for which this comparison was successful continues with the code for execution unit 0. The execution unit for which this comparison was not successful continues in G530 with the comparison to the number 1. If this comparison is successful, there is continuance with the code for execution unit 1 in G540. If this comparison is not successful, an execution unit number unequal to 0 and 1 was therefore ascertained for the corresponding execution unit. This represents a case of a fault, and the method is continued with G550.

In FIG. 8, an example method for 3 execution units is described. After the switchover from a comparison mode to a performance mode has been executed H500, a query of the unit ID or execution unit number H510 is performed by the execution units. According to the present invention, for example, in so doing, execution unit 0 will receive execution unit number 0, execution unit 1 will receive execution unit number 1 and execution unit 2 will receive execution unit number 2. In H510, the ascertained execution unit number is compared to the number 0. If they are the same, in step H520, the execution unit for which this comparison was successful continues with the code for execution unit 0. The execution units for which this comparison was not successful, continue in H530 with the comparison to the number 1. In the execution unit for which this comparison is successful, it is continued with the code for execution unit 1 in H540. The execution units for which this comparison was not successful continue in H535 with the comparison to the number 2. The execution unit for which this comparison is successful is continued with the code for execution unit 2 in H536. If this comparison was not successful, an execution unit number unequal to 0, 1 and 2 was therefore ascertained for the corresponding execution unit. This represents a case of a fault, and the method is continued with H550. As an alternative to the comparison with a number, the ascertained execution unit number may also be used directly as an index in a branch table.

According to this description, this method may also be used for multiprocessor systems having more than 3 execution units.

When there is a switch from performance mode to comparison mode, several things must be taken into consideration. In the switch from performance mode to comparison mode, it must be ensured that after the switchover, the internal states of the execution units are similar; otherwise, in the comparison mode, a fault would possibly be imposed if the different starting states lead to different outputs. This may be accomplished by hardware, by software, by firmware or in a combination of all three. A prerequisite for this is that all execution units execute identical or similar instructions, programs or program segments after the switchover to the comparison mode. A synchronization method is described below which is usable when the comparison mode has the feature that identical instructions are processed and a bit-by-bit comparison is carried out.

FIG. 9, in a flowchart, shows a method which synchronizes the execution units upon the switchover from a performance mode to a comparison mode. In step G600, all interrupts are inhibited. This is not only important because the interrupt controllers must be suitably reprogrammed for the comparison mode. The internal state of the execution units should also be adapted by software. However, if an interrupt is triggered during the preparation for the switchover to the comparison mode, then an adaptation is no longer possible without extra work.

Step G610: If the two execution units have separate caches, then the contents of the caches must also be adapted prior to the switchover to prevent a cache hit from occurring for the one execution unit and a cache miss from occurring for the other execution unit for one address in the comparison mode. If this is not implemented independently by the cache hardware, it can be accomplished, for example, by marking all cache lines as invalid. It is necessary to wait until the cache (or the caches) are completely invalid. If necessary, this may be ensured by a wait loop in the program code. It may also be achieved by other means; it is crucial that the caches be in the same state after this step.

In step G620, the write buffers of the execution units are emptied, so that after the switchover, no activities of the execution units take place which still stem from the performance mode.

In step G630, the state of the pipeline levels of the execution units is synchronized. For this purpose, for example, a suitable number of NOP (no operation) instructions are executed prior to the switchover sequence/switchover command. The number of NOP instructions is a function of the number of pipeline levels, and is therefore dependent on the specific architecture. Which instruction is suitable as a NOP instruction is likewise a function of the architecture. If the execution units have an instruction cache, then in this case it must be ensured that this instruction sequence is aligned at the boundaries of a cache line (alignment). Since the instruction cache has been marked as invalid prior to the execution of these NOPs, these NOPs must first be loaded into the cache. If this instruction sequence begins at a cache line boundary, then the data transfer from the memory (e.g., RAM/ROM/flash) to the cache will be completed before the command for the switchover takes place. This must also be taken into account when determining the necessary number of NOPs.

In step G640, the command step for the switchover to the comparison mode is actually carried out.

In step G650, the contents of the respective register files of each execution unit are adapted. For this purpose, the registers must be loaded with identical contents before or after the switchover. In so doing, it is important that after the switchover, the contents of a register in the execution units are identical before the register contents are transferred to the outside and therefore compared by the comparison unit.

In step G660, the interrupt controllers are reprogrammed, so that an external interrupt signal triggers the same interrupt for all interconnected execution units.

In step G670, the interrupts are enabled again. If it is not clear from the program run when it is intended to switch to the comparison mode, then the participant execution units must be informed about the intended switchover. To that end, an interrupt is initiated, for instance, by SW in the interrupt controllers belonging to the respective execution units. The handling of the interrupt then induces the execution of the sequence for the interconnection described above.

FIG. 10 shows a finite state machine which represents the switchover between a performance and a comparison mode (and vice versa). At the start of the system, caused by "power on" or also reset (software or hardware), the system is shifted via transition G800 into state G700. In general, it holds true that after an undefined event which is able to trigger a reset, the system always begins to operate in state G700. Illustrative events which are able to trigger a reset are external signals, problems in the voltage supply or internal fault events which make further work no longer useful. State G700 of switchover and comparison unit G70 and also of multiprocessor system G60, in which work is carried out in the performance mode, is therefore the default state of the system. Default state G700 is assumed in all cases in which an otherwise undefined state would be assumed. This default setting of state G700 is ensured by hardware measures. For example, the system state or the state of switchover and comparison unit G60 may be coded in a register, in one bit in a register, by a bit combination in a register or by a flip-flop.

It is then ensured by hardware that state G700 is always assumed after a reset or "power on". This is ensured in that, for example, the reset signal or the "power on" signal is conducted to the reset input or the set input of the flip-flop or of the register.

In state G700, the system operates in a performance mode. Execution units G10a, G10b thus process different commands, programs or program pieces. A switchover request can be recognized by the fact that, for example, one execution unit G10a, G10b executes a special switchover command. Other possibilities are a recognition due to the access to a special memory address, by an internal signal or also by an external signal. As long as there is no switchover request, multiprocessor system G60, and thus also switchover and comparison unit G70, remains in state G700. In the following, the switchover request denotes the recognition of a switchover condition which is characterized the way a switchover request is characterized in this special system.

The fact of remaining in state G700 is represented by transition G810. If execution unit G10a detects a switchover request, then switchover and comparison unit G70 is transferred into state G710 via transition G820. State G710 therefore denotes the situation when execution unit G10a has recognized a switchover request and is waiting until execution unit G10b likewise recognizes a switchover request. As long as this is not the case, switchover and comparison unit G70 remains in state G710, which is shown by transition G830.

Transition G840 takes place when, in state G710, execution unit G10b likewise detects a switchover request. Switchover and comparison unit G70 thereby assumes state G730. This state denotes the situation when both execution units G10a, G10b have recognized a switchover request. In state G730, the synchronization methods are carried out, by which the two execution units G10a, G10b are synchronized relative to each other, to subsequently operate in comparison mode. During this process, switchover and comparison unit G70 remains in state G730, which is shown by transition G890.

If, in state G700, a switchover request is first recognized by execution unit G10b, then there is a switch to state G720 via transition G860. State G720 therefore denotes the situation when execution unit G10b has recognized a switchover request and is waiting until execution unit G10a likewise recognizes a switchover request. As long as this is not the case, switchover and comparison unit G70 remains in state G720, which is shown by transition G870. Transition G880 takes place when, in state G720, execution unit G10a likewise recognizes a switchover request. The switchover and comparison unit thereby assumes state G730.

If, in state G700, both execution units G10a, G10b recognize a switchover request at the same time, then there is an immediate change to state G730. This case represents transition G850.

When switchover and comparison unit G70 is in state G730, both execution units G10a, G10b have recognized a switchover request. In this state, the internal states of execution units G10a, G10b are synchronized, in order to operate in comparison mode after these synchronization processes have ended. With the termination of this synchronization work, transition G900 takes place. This transition indicates the end of the synchronization. In state G740, execution units G10a, G10b operate in comparison mode. The completion of the synchronization work may be signaled by execution units G10a, G10b themselves. This means that transition G900 takes place when both execution units G10a, G10b have signaled that they are ready to operate in comparison mode. The termination may also be signaled via a fixed set time. This means that the length of time to remain in state G730 is permanently coded in switchover and comparison unit G70. This time is set in such a way that, with certainty, both execution units G10a, G10b have completed their synchronization work. After this time has expired, transition G900 is then initiated. In another variation, switchover and comparison unit G70 may monitor the states of execution units G10a, G10b and recognize itself when both execution units G10a, G10b have ended their synchronization work. After this recognition, transition G900 is then initiated.

As long as no switchover request is recognized, multiprocessor system G60 remains in comparison mode, represented by transition G910. When, in state G740, a switchover request is detected, the switchover and comparison unit is shifted via transition G920 to state G700. As already described, in state G700, the system operates in performance mode. The separation of the program flows upon transition from state G740 to state G700 may then be carried out as in the method described.

FIG. 11 shows a multiprocessor system G400 having two execution units G410a, G410b, as well as two interrupt controllers G420a, G420b, including interrupt masking registers G430a, G430b contained therein and various interrupt sources G440a through G440n. Also shown is a switchover and comparison unit G450 having a special interrupt masking register G460.

Advantageously, each execution unit G410a, G410b has its own interrupt controller G420a, G420b, to be able to handle two interrupts simultaneously in performance mode. This is especially advantageous in systems in which the interrupt handling represents a bottleneck in the system performance. In this context, interrupt sources G440a through G440n are each advantageously connected the same to both interrupt controllers G420a, G420b. The result of this type of connection is that, without further measures, the same interrupt is triggered at both execution units G410a, G410b. In performance mode, interrupt controllers G420a, G420b are programmed in such a way that corresponding interrupt sources G440a through G440n are suitably distributed to the different execution units G410a, G410b depending upon the application. This is accomplished by suitable programming of interrupt masking registers G430a, G430b. The masking registers provide for one bit in the register for each interrupt source G440a through G440n. If this bit is set, the interrupt is blocked, thus it is not routed to connected execution unit G410a, G410b. Advantageously, in a performance mode, a given interrupt source G440a through G440n is processed by exactly one execution unit G410a or G410b. Expediently, this holds true at least for some of the interrupt sources. In this way, a plurality of interrupt sources G440a through G440n may be processed simultaneously without an interrupt nesting (processing of an interrupt is interrupted by a second interrupt) or interrupt pending (the processing of the second is postponed until the processing of the first is completed) taking place.

In comparison mode, it must be ensured that interrupt controllers G420a, G420b trigger the same interrupt simultaneously at all execution units G410a, G410b; otherwise, in accordance with a comparison mode, a fault would be imposed. This means that in the synchronization phase during the switchover from performance mode to comparison mode, it is necessary to ensure that interrupt masking registers G430a, G430b are identical. This synchronization is described in FIG. 9 in step G660. This synchronization may be implemented by software, by programming both interrupt masking registers G430a, G430b accordingly with the same value. It is suggested to use a special register G460 to accelerate the switchover process. In one specific embodiment, this register G460 is disposed in switchover and comparison unit G450, but it may also be included in switchover request recognition unit G40, in a combined switchover request recognition unit, in the comparator, in switchover unit G80, as well as in all combinations. It is equally conceivable to arrange this register at a different suitable location outside of these three components. Register G460 contains the interrupt masking, which is intended to be effective in the comparison mode. Switchover and comparison unit G450 receives from switchover request recognition unit G40, a signal for the switchover from a performance to a comparison mode. After the interrupts have been inhibited in step G600, interrupt masking registers G430a, G430b of interrupt controllers G420a, G420b can be reprogrammed. This is now implemented via hardware by switchover and comparison unit G450 in parallel with respect to the remaining synchronization steps, after the switchover signal has been received and interrupt controllers G420a, G420b have been blocked. Advantageously, interrupt masking registers G430a, G430b are not reprogrammed individually in comparison mode, but rather always central register G460. This reprogramming is then transferred synchronously via hardware to the two interrupt masking registers G430a, G430b. The method described here for an interrupt masking register may be transferred in the same manner to all interrupt status registers, which are disposed in an interrupt controller. Naturally, instead of a register G460, it is also conceivable to use another storage medium, from which a transfer can be made as quickly as possible to interrupt masking registers G430a, G430b.

In FIG. 12, a multiprocessor system G1000 is provided having two execution units G1010a, G1010b, a switchover and comparison unit G1020, as well as an interrupt controller G1030 having three different register records G1040a, G1040b, G1050. As an alternative to the design approach described above, a special interrupt controller G1030 is provided as shown in FIG. 12. It is used in a multiprocessor system G1000 which is shown in the example with two execution units G1010a, G1010b, as well as a switchover and comparison unit G1020 that is able to switch between a comparison and a performance mode.

Register records G1040a, G1040b are used in the performance mode. In this case, interrupt controller G1030 operates exactly like two interrupt controllers G420a, G420b. This behavior is illustrated and described in FIG. 11. In this context, register record G1040a is assigned to execution unit G1010a, and register record G1040b is assigned to execution unit G1010b. Interrupt sources G1060a through G1060n are suitably distributed to execution units G1010a, G1010b by masking. In the switch from a performance mode to a comparison mode, switchover and comparison unit G1020 generates a signal G1070. It signals to interrupt controller G1030 that there is a switch taking place to comparison mode, i.e., that as of this moment, the system is operating in comparison mode. Interrupt controller G1030 thereupon uses register record G1050. It is thereby ensured that the same interrupt signals are obtained at both execution units G1010a, G1010b. With a change from comparison mode to performance mode, which switchover and comparison unit G1020 again signals to interrupt controller G1030 via signal G1070, there is a switch again to register records G1040a, G1040b. Advantageously, it is therefore also possible to protect the corresponding register records, in that in performance mode, writing is allowed only to register records G1040a, G1040b, and writing to register record G1050, which is reserved for the comparison mode, is prevented by hardware. The same is also possible in the other direction, that in comparison mode, writing is allowed only to register record G1050, and writing to register records G1040a, G1040b is prevented.

FIG. 13 shows an example form of a comparator M500, G20. Comparator M500 is a component in a multiprocessor system G60 having at least two execution units G10a, G10b with a switchover between a performance mode and a comparison mode. It is shown in the simplest form in FIG. 13. Comparison component M500 is able to receive two input signals M510 and M511. It then compares them for equality, in the context presented here, e.g., in the sense of a bitwise equality. In the case of equality, the value of input signals M510, M511 is given to output signal M520, and fault signal M530 becomes non-active, that is, it signals the "good" state. If it detects disparity, fault signal M530 is activated. Signal M520 may then optionally be deactivated. This has the advantage that the fault does not get out of the corresponding system ("fault containment"). That is to say, other components situated outside of the execution units are not corrupted by the potentially faulty signal. However, there are also systems in which signal M520 does not have to be deactivated. For example, this is the case when only fail-silence is required on the system level. For instance, the fault signal may then be conducted to the outside.

Starting from this basic system, a multitude of example embodiments are conceivable. First of all, component M500 may be realized as a so-called TSC (totally self checking) component. In this case, fault signal M530 is conducted to the outside on at least two lines ("dual rail"), and internal design and fault-discovery measures ensure that in any possible case of fault of the comparison component, this signal exists correctly or recognizably incorrectly. In this context, a dual rail signal makes a binary signal available via two lines, so that in a faultless case, the two lines are inverted relative to each other. One example variant in the utilization of the system according to the present invention is to use such a TSC comparator.

A second class of example embodiments may be differentiated with respect to what degree of synchronism the two inputs M510, M511 (or M610, M611) must have. One possible specific embodiment is characterized by synchronism with clock-pulse timing, that is, the data may be compared in a clock pulse.

A slight change is obtained in that, given a fixed phase shift between the inputs, a synchronous delay element is used which delays the corresponding signals, for example, by half-integral or integral clock-pulse periods. Such a phase shift is useful to avoid common cause faults, that is, those causes of faults which are able to influence several processing units similarly and simultaneously.

Therefore, FIG. 14 depicts a further example embodiment. Components and signals M600, M610, M611, M620, M630 have the same meaning as the corresponding components and signals M500, M510, M511, M520, M530 from FIG. 13. In FIG. 14, in addition to these components, component N640 is therefore inserted which delays the temporally earlier input by the phase shift. This delay element is accommodated in the comparator, in order to use it only in comparison mode.

Alternatively or additionally, temporary buffers M650, M651 may be placed into the input chain, to likewise be able to tolerate those asynchronisms which do not present themselves as pure clock pulse offset or phase shift. These temporary buffers are preferably designed as FIFO (first-in, first-out) memories. Such a memory has one input and one output, and is able to store several memory words. An incoming memory word is displaced in its position upon arrival of a new memory word. After the last position (the depth of the buffer), it is moved "out of the memory." If such a buffer is present, it is also possible to tolerate asynchronisms up to the maximum depth of the buffer. In this case, a fault signal must also be output when the buffer overflows.

Further, in the comparator it is possible to differentiate example embodiments according to how signal M520 (or M620) is generated. One preferred specific embodiment provides for connecting input signals M510, M511 (or M610, M611) through to the output, and making the connection interruptible by switches. The particular advantage of this specific embodiment is that these same switches may be used for switching between performance mode and possible different comparison modes. Alternatively, the signals may also be generated from buffers internal to the comparator.

A last class of example embodiments can be differentiated with respect to how many inputs exist at the comparator and how the comparator is intended to react. In the case of three inputs, a majority voting, a comparison of all three or a comparison of only two signals may be performed. In the case of four or more inputs, additional embodiments are conceivable. A detailed description of the possible embodiments is contained in the description of FIG. 20.

The precise selection of the example embodiments is to be coupled to the various operating modes of the overall system. That is to say, if there are several different performance or comparison modes, then they are coupled to the corresponding mode of the comparator.

At a few points in this invention, it is necessary or advantageous to deactivate a comparator or a more general voting/processing/sort element(for the sake of simplicity, hereinafter always known as comparator), or to make it passive. There are many possibilities for that. First of all, a signal may be carried to the comparator, which activates or deactivates it. To that end, an additional logic which is able to accomplish this must be inserted in the comparator. Another possibility is to supply no data to be compared to the comparator. A third possibility is to ignore the fault signal of the comparator on the system level. Moreover, one may also interrupt the fault signal itself. What all the possibilities share in common is that it plays no role in the system, that two or more data, which potentially are compared, are different. If this is the case, the comparator is regarded as passive or deactivated.

Below, an implementation of a changeover switch in conjunction with a comparator, thus a switchover and comparison unit G70 is considered. This implementation is particularly favorable if it is realized together with execution units G10a, G10b within a chip.

By combining the comparator and changeover switch components, only a very small hardware overhead results upon implementation within a chip. One variant of the implementation is therefore to combine these two parts in one component. This is a component having at least the input signals (output execution unit 1, output execution unit 2), at least the output signals (output 1, output 2), a logical output signal "output overall" (can agree physically with output 1 or output 2) and a comparator. The component has the ability to switch the mode, to let through all signals in the performance mode, and in a comparison mode, to compare a plurality of signals and, if applicable, let one through.

Additionally, still further input and output signals are advantageous: A fault signal to signal a detected fault, a mode signal to signal the mode in which this component finds itself, and control signals from and to the component.

In one exemplary embodiment, in performance mode, the two or more execution units are connected as master to a bus internal to the processor. The comparison unit is deactivated, or the fault signal, which is generated in response to a different behavior of the execution units in one of the conceivable comparison modes, is masked. This means that the switchover and comparison unit is transparent for the software. In the comparison mode considered, the physical execution units to be compared are handled as one logical execution unit at the bus, that is, only one master appears at the bus. The fault signal of the comparator is activated. In addition, the switchover and comparison unit separates all except for one execution unit via switch from the bus internal to the processor, duplicates the inputs of the one logical execution unit and makes them available to all execution units participant in the comparison mode. In the case of writing to the bus, the outputs are compared in the comparison unit, and, given equality, this data is written via the one available access to the bus.

In FIG. 15 and FIG. 16, the behavior in principle of component M700 (switchover and comparison unit, corresponds to G70) is described. For the sake of simplicity, these figures are only drawn for two execution units. FIG. 15 shows the status of the component in comparison mode, FIG. 16 in performance mode. The various switch positions in these modes are realized by M700 through drive circuit M760. Initially in performance mode, the two execution units M730, M731 are able to write to data and address bus M710 when switches M750 and M751 are closed, as shown in FIG. 16. It is assumed that possible write conflicts are resolved either via the bus protocol or by further components not marked in. In comparison mode, the behavior is different, at least from the logical point of view. As shown in FIG. 15, switches M750, M751 are then opened, and thus the possibilities for direct access are interrupted. However, in contrast to FIG. 16, in FIG. 15, switches M752, M753 are then closed. Signals M740, M741 of execution units M730, M731 are conducted to comparison component M720. It is set up at least as drawn in FIG. 13, but may also contain elaborations as described in FIG. 14. However, a representation of the fault signal or also of further signals of comparison component M720 is omitted in FIG. 15 and FIG. 16. If the two signals match, switch M754 is closed, and one of the two matching signals is then relayed to address/data bus M710. In sum, to that end, it is necessary that switchover and comparison unit M700 be able to influence switches M750-M754. The specific switch position is a function of the mode and the fault recognition. Variants in which switch M754 is always closed and a suitable system reaction is generated by the fault signal are hereby also covered.

FIG. 17 shows a variant of the switchover and comparison unit. Even for a simple system having only two execution units G10a, G10b, there are already many variants for the implementation of a switchover and comparison unit. One further, which is particularly advantageous when no buffers are to be used in the comparator, is shown in FIG. 17. As in FIG. 15 and FIG. 16, signals M840, M841 of the execution units are shown. The latter are not shown in this figure. In component M800 of the present invention is a mode logic M810 which specifies the mode of the component. In performance mode, it closes switch M831, and in comparison mode it opens it. Moreover, it sends the mode signal to comparator M820. In this implementation, the comparator always performs a comparison, but uses the result of the comparison and the mode signal to drive switch M830. In performance mode, the switch is always closed, in comparison mode, always when no fault is present. Naturally, if a fault has once been determined, the switch may also continue to remain open until a suitable reset arrives.

FIG. 18 shows another example embodiment of the switchover and comparison unit. This alternative indeed has more switches, but instead leaves the comparator inactive in performance mode, and is therefore also able to handle asynchronisms more easily. There are again the two signals M940, M941 of the execution units. The latter are again not shown in this figure. In component M900 of the present invention is a mode logic M910 which specifies the mode of the component. In performance mode, it closes switch M931 and opens switches M932, M933. Therefore, comparison component M920 is not fed with data in this mode. In the event of asynchronisms, this allows longer buffer times, or in one implementation, smaller buffer depths. In performance mode, switch M930 is always closed. In comparison mode, component M910 closes switches M932, M933 and interrupts the direct access to the bus by opening switch M931. Optionally, mode logic M910 may even communicate the mode to comparator M920. In the fault-free case, switch M930 is closed in comparison mode. In the case of a fault, comparison component M920 interrupts the relay of signal M940 to the bus by opening switch M930.

In the illustrations described, it is possible to conduct the mode or fault signals to the outside without extra work. Furthermore, it is easily possible, especially for generating the internal mode state, for further signals to go to the component.

In summary, an example implementation of this component is thus characterized in that there is a plurality of processing units, which are able to write output signals onto the bus (e.g., address/data bus). It is essential that the component be able to process at least two of the output signals of the execution units (e.g., compare, but possibly also vote or sort), and that the component be able to influence at least one switch by which at least one of the direct bus accesses is interrupted. This is especially useful when the execution units are processor cores. Moreover, it is advantageous if the state of the influenceable switches characterizes the operating mode of the arithmetic unit.

The system properties, particularly the possible comparison modes, are implemented particularly well when the component is able to place a signal on the address-data bus.

Advantageously, this is a through-connection of one of the output signals of one of the execution units. Alternatively, it may be obtained from the processing of various output signals of the various execution units.

As already became clear, for example, in the descriptions with respect to FIGS. 17 and 18, it is possible to identify mode information in the system and—depending upon the division into the components—in one of the components, as well. Depending upon the implementation, this mode information may even exist explicitly in a subcomponent. In one example implementation, this signal may also be carried out of the component and made available to other parts of the system.

In the general case, the behavior according to the present invention may be clarified with reference to FIG. 21. Signals and components N100, N110, N120, N130, N140, N141, N142, N143, N14n, N160, N161, N162, N163, N16n have the same meaning as in FIG. 20. Moreover, mode signal N150 and fault signal N170 are marked in in this figure. The optional fault signal is generated by fault circuit logic N130 which collects the fault signals, and is either a direct forwarding of the individual fault signals or a bundling of the fault information contained therein. Mode signal N150 is optional, however its use outside of this component can be advantageous at many places. The combination of the information of switching circuit logic N110 (i.e., the function described in the description of FIG. 20) and of the processing logic (i.e., the determination of the comparison operation per output signal, that is, per functional value) constitutes the mode information, and it establishes the mode. In the general case, this information is naturally multi-valued, that is, is not only representable via one logic bit. Not all theoretically conceivable modes are useful in a given implementation; one will generally limit the number of modes allowed. The mode signal then brings the relevant mode information to the outside. A HW implementation is represented in such a way that the externally visible mode signal can be configured. The processing logic and the switching circuit logic are likewise configurably conceived. These configurations are coordinated with one another. Alternatively, one may only or additionally give changes of the mode signal to the outside, as well. This has advantages, especially in a dual configuration.

This mode signal is protected. One implementation in the dual system based, for example, on the implementation shown in FIG. 17, is shown in FIG. 19. There, signal M850 is brought out of the switchover and comparison unit. In a dual system, this information is logically representable via one bit. A protection may then advantageously be represented via a dual-rail signal. In the general case, the signal may likewise be protected via a doubling, which optionally is inverted.

Alternatively, a parity may also be generated, which preferably is generated internally in fail-safe manner, or a CRC (cyclic redundancy check) or ECC (error correcting code) may be used.

The mode signal may be used outside of the component. First of all, it may be used for self-monitoring of the operating system. From the SW standpoint, it is responsible for a switchover and should always know the mode the system is in and should also bring the system into this mode. A check of this signal may thus be used for the protection. First of all, this may be done directly. However, an alternative possibility is also, via timers or other "independent" units, to determine the plausibility of a query in the operating system with this signal.

In general, as an option, this signal may also be used in other data sinks of a μC (or more general arithmetic unit). For example, an MPU (memory protection unit) may be programmed in such a way that it allows specific memory accesses (of specific execution units) only in specific modes. In this context, a MPU is a unit which is able to ensure that only allowed accesses to the data/address bus are implemented; for example, for certain program parts, it prevents access to certain address spaces. An additional protection may be provided by directing the mode signal to the MPU, suitable configuration and programming of this MPU, and evaluation of this configuration data and of the mode signal. This may possibly even simplify the programming, in the event the mode signal already constitutes sufficient information for the check test. A quasi-static programming at the initialization time of the μC then suffices. The equivalent may hold true for peripheral units. Here as well, there are applications in which an access to a corresponding peripheral element is allowed only in certain modes. An additional protection may be provided by directing the mode signal to the peripheral element, suitable configuration and programming of the peripheral element, and evaluation of this configuration data and of the mode signal. This may possibly even simplify the programming, in the event the mode signal already constitutes sufficient information for the check test. A quasi-static programming at the initialization time of the μC then suffices. In an analogous manner, the evaluation of this signal may also be used at the interrupt controller. Such monitoring operations can then make up the basis or an essential part of the safety concept. By suitable design and SW structuring, it may be possible to base the safety concept for an entire class of faults on this mode signal in the practical application considered. This is particularly advantageous when the mode signal in a suitable form, as described above, is intrinsically safe. In this case, it is then further advantageous if the component considered has the possibility of sending a fault signal or activating a shutdown path if it detects an inconsistency between the mode signal and the access to itself.

Another important use is the evaluation of the mode signal outside of the arithmetic unit. A direct practical application is the evaluation in a decrementing watchdog. Such a watchdog is made up of at least one (counter-) register, which can be set to an integer value by the microprocessor. After this register has been set, the watchdog independently decrements the value of the register with a fixed period. If the value of the register is zero or if an overflow occurs, the watchdog generates a fault signal. If the fault signal is not to be generated, then the microprocessor must reset the value of the register again in good time. It is thereby possible to check (within limits), whether the microprocessor is executing the software correctly. If the microprocessor is no longer executing the software correctly, it is assumed that in this case, the watchdog is also no longer being operated correctly, and therefore a fault signal is generated by the watchdog. The integrity of the hardware and of the data structures may be checked reliably in a comparison mode; to that end, however, it is necessary to ensure that the microprocessor switches back again at regular intervals into this mode. Therefore, the task of the watchdog described here is to generate a fault signal not only when it is no longer reset within a defined period of time, but also when the microprocessor no longer switches back to the defined comparison mode within a defined period of time. For example, the watchdog can be reset only when the mode signal indicates the defined comparison mode of the arithmetic unit. It is thereby ensured that the arithmetic unit switches back to this mode at regular intervals. Alternatively or additionally, the value in the register of the watchdog is only decremented when specific interrupts are triggered in the microprocessor. To that end, the external interrupt signals of the μC must also be coupled to the watchdog. The watchdog stores which interrupts switch the μC to the defined comparison mode. The watchdog is "wound up" as soon as such an interrupt arrives; it is reset by the presence of the correct mode signal.

Quite generally, it is useful, especially in the application to a safety concept, to evaluate the mode signal in a source external to the μC. An important point in safeguarding the correct execution of the software on a computer, as it is described in the present invention, is the correct change between the various allowed modes. First of all, the change capability itself should be checked, and also the correct change. As described above, one may also take an interest that a special mode is assumed at regular intervals. Such a method is always especially advantageous when the mode signal itself is implemented to be intrinsically safe.

One possibility is to conduct the mode signal to an ASIC or another μC. Using this signal, via timers and simple logic, it is able to check at least the following points:

Does the arithmetic unit come sufficiently often (e.g., at the latest every 1000 μs) into one or several defined modes?

Is a specific signal always output in response to the change to a mode?

Does the arithmetic unit regularly go out of a mode?

Are certain simple patterns of the sequence of the modes valid?

Is a general time pattern valid (e.g., on average <70% in mode 1 and <50% in mode 2)?

Any combination of logical, temporal properties of the mode signal, possibly supplemented by utilization of additional signals.

In this context, FIG. 22 describes the basic configuration for a proposal which goes further, in which a special query-reply interplay is carried out between such a partner ASIC or μC and the arithmetic unit considered which makes use of this invention. N300 is an arithmetic unit which is able to emit such a mode signal. For example, it may be a μC having a plurality of execution units and another component which is able to generate this mode signal. This other component may be realized as in FIG. 19 or FIG. 21, for instance. N300 transmits this signal N310 to the partner (e.g., other arithmetic unit, other μC or ASIC) N330. It is able to ask N300 questions via this signal N320, which N300 has to answer via N321. Such a query may be a computing task, whose correct result is to be supplied by N300 via N321 within a defined time interval. N330 is able to check the correctness of this result independently of N300. For example, the results are stored in N330, or N330 can calculate them itself. Upon detection of an incorrect value, a fault is imposed. The special feature in the query-reply communication proposed is that the mode signal is observed in parallel with the reply. Preferably, the questions are to be asked in such a way that for the reply by N300, it must assume certain modes. It may thereby be checked in reliable fashion that all mode changes are functional, and that mode changes provided in the program run are also carried out. This may serve as an essential component of a safety concept, particularly during the initializing of a system, but also in operation.

A further application of this idea is the evaluation of the mode signal in an actuator drive circuit. In many applications in the automotive sector, there is a trend today to so-called intelligent actuators. They are actuators having a minimal amount of electronics which are sufficient to receive an actuator control command and to then drive the actuator in such a way that this control command is then also executed.

The basic idea is illustrated in FIG. 23. An arithmetic unit N400, which makes use of the invention, gives a control command via connection N420 to an (intelligent) actuator or an actuator drive circuit N430. It gives the mode signal to this actuator concurrently via connection N410. Based on the mode signal, actuator N430 checks whether the driving is allowed, and optionally gives a fault status back via signal N440. In the event of incorrect driving, it assumes the fail-silence state which is uncritical in the system.

What is claimed is:

1. A device for performing a switch-over operation in a computer system having at least two execution units, comprising:
a switch-over unit configured to perform a switch-over between at least two operating modes, wherein a first operating mode is a comparison mode and a second operating mode is a performance mode;
a programmable interrupt controller assigned to each execution unit; and
a storage element storing information describing at least a part of a configuration of at least one of the interrupt controllers;
wherein in a switchover from the performance mode to the comparison mode, the same information is transmitted from the storage element to at least two interrupt controllers.

2. The device as recited in claim 1, further comprising:
a transfer unit configured to facilitate a transfer of information from the storage element to at least one of the interrupt controllers.

3. The device as recited in claim 2, wherein, in response to a switch-over between the performance mode and the comparison mode, a new configuration of at least one interrupt controller is implemented by transferring information from the storage element to the at least one interrupt controller.

4. The device as recited in claim 2, wherein complete configuration information of the at least one of the interrupt controllers is contained in the storage element.

5. The device as recited in claim 2, wherein the storage element is a register record.

6. The device as recited in claim 2, wherein the storage element is an interrupt masking register.

7. The device as recited in claim 2, wherein interrupts are triggered simultaneously in the comparison mode.

8. The device as recited in claim 2, wherein, in response to a switch-over from the performance mode to the comparison mode, the information stored in the storage element is transferred to the interrupt controllers.

9. The device as recited in claim 1, further comprising:
a transfer unit configured to facilitate a transfer of information from the storage element to at least one of the interrupt controllers;
wherein, in response to a switch-over between the performance mode and the comparison mode, a new configuration of at least one interrupt controller is implemented by transferring information from the storage element to the at least one interrupt controller, and
wherein complete configuration information of the at least one of the interrupt controllers is contained in the storage element.

10. The device as recited in claim 9, wherein the storage element is one of a register record an interrupt masking register, wherein interrupts are triggered simultaneously in the comparison mode, and wherein, in response to a switch-over from the performance mode to the comparison mode, the information stored in the storage element is transferred to the interrupt controllers.

11. A method for performing a switch-over in a computer system having at least two execution units, comprising:
performing a switch-over between at least two operating modes using a switch-over unit, wherein a first operating mode is a comparison mode and a second operating mode is a performance mode;
providing a programmable interrupt controller for each execution unit; and
storing in a storage element information describing at least a part of a configuration of at least one of the interrupt controllers;
wherein in a switchover from the performance mode to the comparison mode, the same information is transmitted from the storage element to at least two interrupt controllers.

12. The method as recited in claim 11, wherein information is transferred from the storage element to at least one of the interrupt controllers.

13. The method as recited in claim 12, wherein information is transferred from the storage element to at least one of the interrupt controllers via a hardware medium.

14. The method as recited in claim 12, wherein, in response to a switch-over between the performance mode and the comparison mode, a new configuration of at least one interrupt controller is implemented by transferring information from the storage element to the at least one interrupt controller.

15. The method as recited in claim 12, wherein complete configuration information is transferred from the storage element to the at least one of the interrupt controllers.

16. The method as recited in claim 12, wherein interrupts are triggered simultaneously in the comparison mode.

17. The method as recited in claim 12, wherein, in response to a switch-over from the performance mode to the comparison mode, the information stored in the storage element is transferred to the interrupt controllers.

18. The method as recited in claim 11, wherein information is transferred from the storage element to at least one of the interrupt controllers, wherein, in response to a switch-over between the performance mode and the comparison mode, a new configuration of at least one interrupt controller is implemented by transferring information from the storage element to the at least one interrupt controller, and wherein complete configuration information is transferred from the storage element to the at least one of the interrupt controllers.

19. The method as recited in claim 18, wherein interrupts are triggered simultaneously in the comparison mode, and wherein, in response to a switch-over from the performance mode to the comparison mode, the information stored in the storage element is transferred to the interrupt controllers.

* * * * *